United States Patent [19]

Takigawa et al.

[11] Patent Number: 4,732,129
[45] Date of Patent: Mar. 22, 1988

[54] CONTROL APPARATUS FOR ELECTROEXPANSIVE ACTUATOR ENABLING VARIATION OF STROKE

[75] Inventors: Masahiro Takigawa, Nukata; Toshihiko Igashira, Toyokawa; Yasuyuki Sakakibara, Nishio; Kazuhide Watanabe, Toyohashi, all of Japan

[73] Assignee: Nippon Soken, Inc., Nishio, Japan

[21] Appl. No.: 850,696

[22] Filed: Apr. 11, 1986

[30] Foreign Application Priority Data

| Apr. 15, 1985 | [JP] | Japan | 60-78529 |
| Apr. 18, 1985 | [JP] | Japan | 60-81432 |
| May 27, 1985 | [JP] | Japan | 60-112036 |

[51] Int. Cl.⁴ .......................... H01L 41/08; B05B 3/14
[52] U.S. Cl. ..................... 123/478; 123/494; 123/498; 123/642; 310/316; 239/102.2
[58] Field of Search ............... 123/478, 494, 642, 498; 239/102; 84/DIG. 24; 310/311, 316, 317, 318

[56] References Cited

U.S. PATENT DOCUMENTS

| 4,333,434 | 6/1982 | Brunais et al. | 123/478 |
| 4,404,502 | 9/1983 | Mayori et al. | 310/316 |
| 4,445,064 | 4/1984 | Bullis | 310/316 |
| 4,469,974 | 9/1984 | Speranza | 123/494 |
| 4,537,353 | 8/1985 | Speranza | 123/494 |
| 4,586,110 | 4/1986 | Yamamoto | 310/311 |
| 4,644,212 | 2/1987 | Moritugu et al. | 310/316 |

FOREIGN PATENT DOCUMENTS

| 0152161 | 9/1983 | Japan | 123/498 |
| 2082251 | 3/1982 | United Kingdom | 123/498 |

Primary Examiner—Raymond A. Nelli
Attorney, Agent, or Firm—Cushman, Darby & Cushman

[57] ABSTRACT

A color apparatus includes an electroexpansive actuator, a unit for supplying a charge to the electroexpansive actuator, and a unit for controlling an amount of charge discharged from the electroexpansive actuator, and a stroke of the electroexpansive actuator is controlled in accordance with the amount of charge discharged therefrom. When such an electroexpansive actuator is applied to a control apparatus for a fuel injection valve, a fuel injection amount per ON/OFF operation of the fuel injection valve or a fuel injection rate can be freely controlled.

34 Claims, 36 Drawing Figures

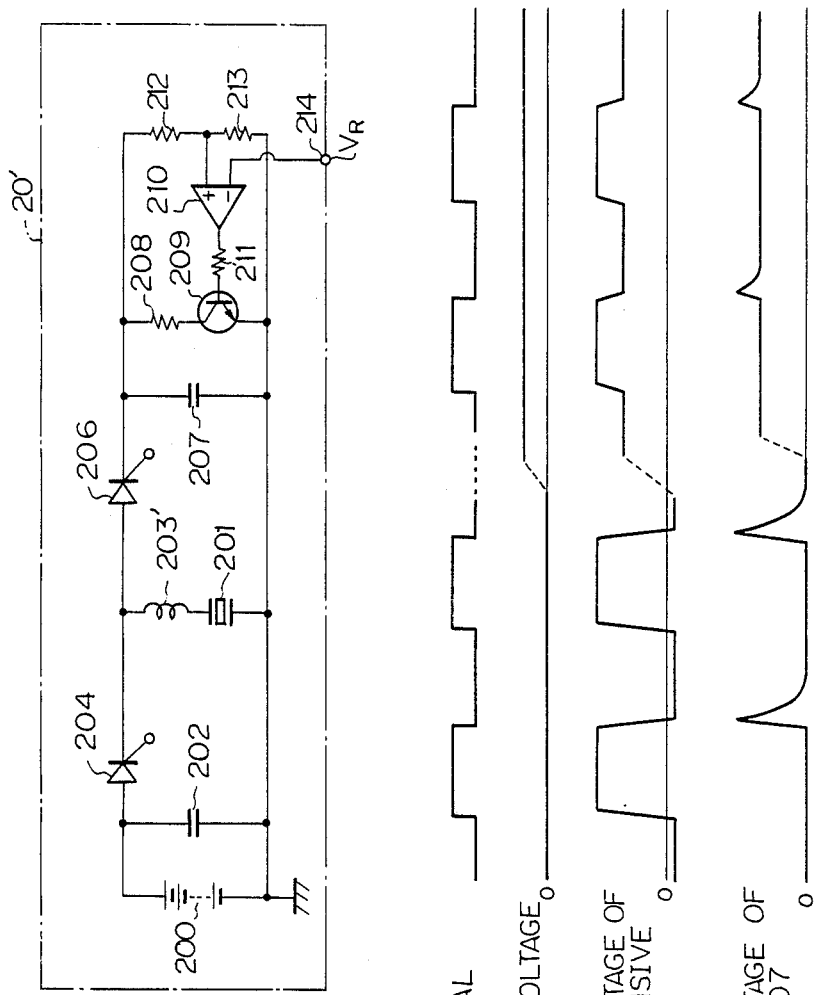

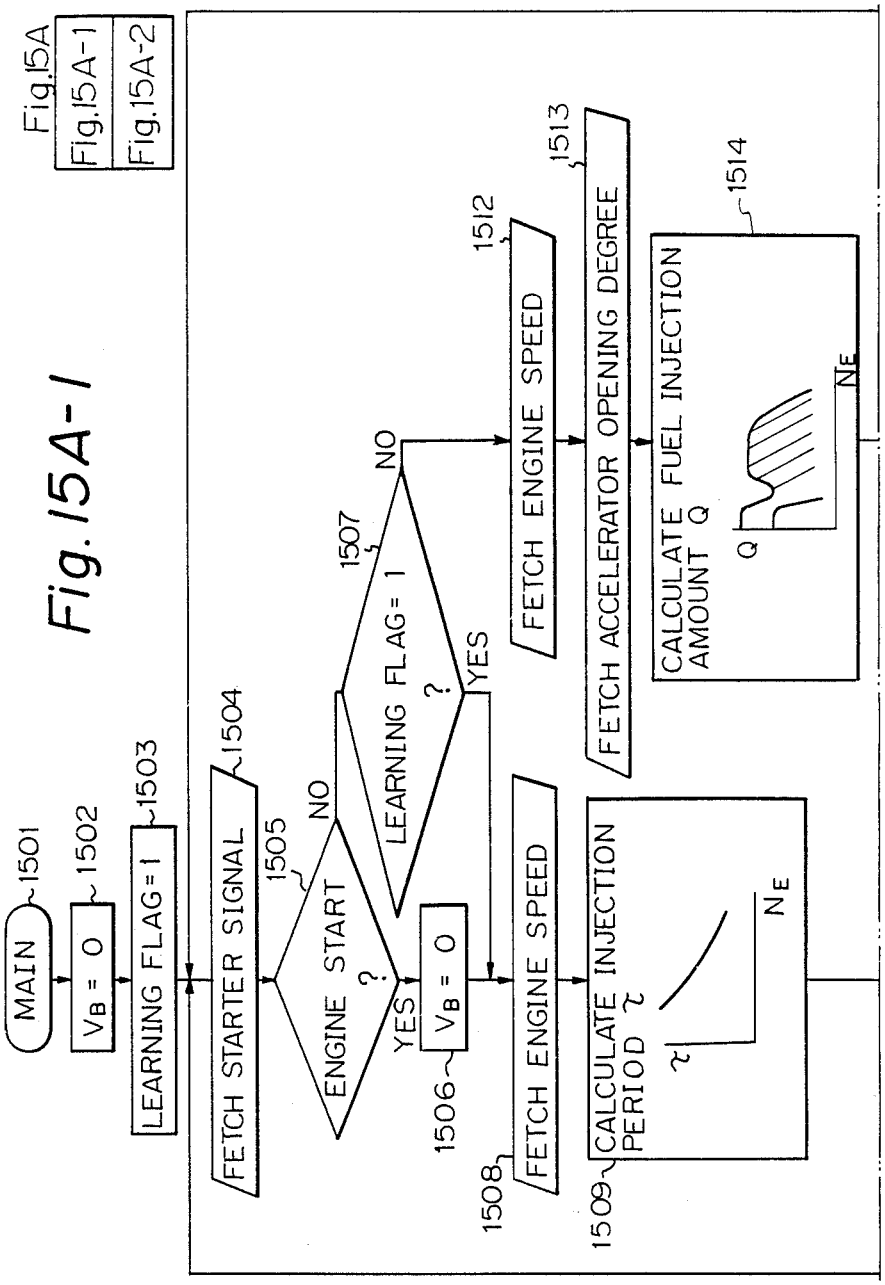

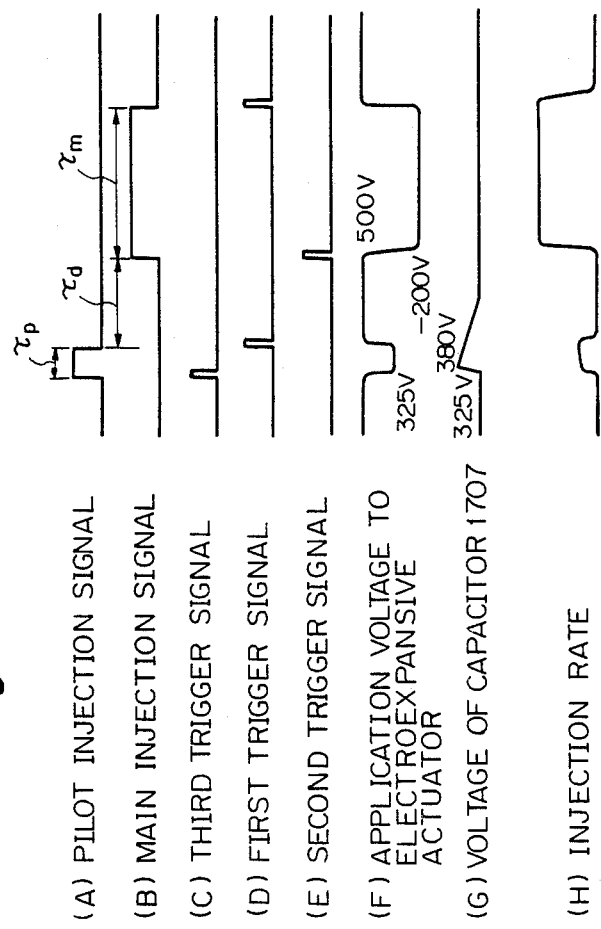

CONTROL APPARATUS FOR ELECTROEXPANSIVE ACTUATOR ENABLING VARIATION OF STROKE

BACKGROUND OF THE INVENTION (1) Field of the Invention

The present invention relates to a control apparatus for an electroexpansive actuator and to a control apparatus and method for controlling a fuel injection valve which supplies fuel to a combustion chamber of an internal combustion engine by using the electroexpansive actuator.

(2) Description of the Related Art

An electroexpansive actuator (hereinafter referred to as the "actuator") generally comprises a group of piezoelectric elements. If a +500 V voltage is applied to the piezoelectric elements, the actuator expands, and if a −200 V voltage is applied to the elements, the actuator contracts. Therefore, in a conventional control apparatus for such an actuator, an amount of contraction of the actuator (i.e., the stroke) can be controlled only by a given constant amount.

When a fuel injection valve is controlled by such an actuator, the following problems are created.

In an internal combustion engine for a vehicle (more specifically, a gasoline engine), a control range for a desired amount of fuel is about 50 times a minimum amount of fuel to be supplied. Therefore, when the amount of fuel is controlled using a fuel injection valve which measures the amount of fuel with reference to a drive frequency, a maximum drive frequency must be about 50 times that of a minimum frequency.

This minimum frequency must be higher than an intake frequency corresponding to a maximum speed of the engine. For example, in a 4-cycle engine, the minimum frequency is 50 Hz or higher with respect to a maximum engine speed of 6,000 rpm. If the minimum frequency is set to 50 Hz, the drive frequency of the fuel injection valve must be within a control range of 50 Hz to 2,500 Hz.

However, even for a high-response fuel injection valve for the gasoline engine, the maximum stable frequency that can be achieved is limited to about 1,000 Hz because of a response-delay during the fuel intake operation. Accordingly, when the stroke of the actuator is constant, a wide control range of injection amount of fuel cannot be obtained.

Also, if such an actuator with a constant stroke is applied to a fuel injection valve for, e.g., a diesel engine, since the lift amount of a nozzle needle is predetermined, an opening area for the injection, and therefore, a fuel injection rate, becomes constant. As a result, the amount of fuel can be controlled only by a valve-open period. Therefore, when an operation range varies widely, as in a vehicle engine, this creates a decrease in power due to a prolonged fuel injection period during high-speed running, and conversely, creates engine noise and a degradation of the emission due to a shortened fuel injection period during low-speed running.

As an effective countermeasure, a known pilot injection operation, in which fuel injection is divided into two or more steps, can be performed. In this case, however, the fuel injection valve cannot be effectively controlled unless a miminum injection amount of fuel for the valve is below the amount that is necessary for appropriate pilot injection (i.e., about 1 mm$^3$), thus requiring a very short response time.

SUMMARY OF THE INVENTION

The present invention has been made in consideration of the above drawbacks, and a main object of the present invention is to realize a variable-stroke electroexpansive actuator by controlling a discharge amount of charges supplied to the actuator (i.e., by varying an amount of contraction thereof).

Another object of the present invention is, when the actuator is applied to a fuel injection valve for a gasoline engine, for example, to vary an amount of fuel injected during each ON1OFF operation of the valve, thereby expanding the injection range of the fuel injection valve without significantly increasing the drive frequency range.

It is still another object of the present invention, when the electeroexpansive actuator is applied to a fuel injection valve of a diesel engine, for example, to adjust an amount of lift of a nozzle needle mounted on the fuel injection valve so as to vary an injection rate. It is a still further object of the present invention to effectively perform the pilot injection control by varying the injection rate, satisfying requirements in injection periods during both high-speed and low-speed running.

In order to achieve the above object, according to an aspect of the present invention, there is provided a control apparatus for an electroexpansive actuator comprising: an electroexpansive actuator; means for supplying a charge to the electroexpansive actuator; and means for controlling an amount of charge discharged from the electroexpansive actuator, wherein a stroke of the electroexpansive actuator is controlled in accordance with the amount of charge discharged therefrom.

According to another aspect of the present invention, there is proivded a control apparatus for a fuel injection valve comprising:

an electroexpansive actuator; means for supplying a charge to the electroexpansive actuator; means for controlling an amount of charge discharged from the electroexpansive actuator; and a nozzle needle which engages with or lifts from a valve seat in accordance with expansion/contraction of the electroexpansive actuator upon supply/discharge of the charge to/from the electroexpansive actuator, wherein an amount of lift of the nozzle needle is controlled in accordance with the amount of charge discharged from the electroexpansive actuator.

According to still another aspect of the present invention, there is provided a control method for a fuel injection valve having an electroexpansive actuator and a nozzle needle, wherein a pilot injection signal and a main injection signal are used for fuel injection signals, an amount of lift of the nozzle needle is reduced from a full-lift state in accordance with a valtage applied to the electroexpansive actuator based on the pilot injection signal, and the nozzle needle is fully lifted by a voltage applied to the electroexpansive actuator based on the main injection signal, thereby enabling fuel injection at different injection rates.

With the arrangement according to the first aspect of the present invention, the amount of charge discharged from the electroexpansive actuator is controlled so as to desirably control a stroke of the electroexpansive actuator.

With the arrangement according to the second aspect of the present invention, the amount of lift of the nozzle needle is controlled in accordance with the amount of charge discharged from the actuator, thereby controlling an opening are of the fuel injection valve. In this way, an amount of fuel injected during each ON/OFF operation of the valve, or the injection rate thereof, can be controlled.

Furthermore, with the arrangement according to the third aspect of the present invention, a voltage to be applied to the electroexpansive actuator is controlled so as to be different value based on each of the pilot and main injection signals, thus performing pilot injection at a low injection rate and main injection at a high injection rate (i.e., when the nozzle needle is fully lifted).

BRIEF DESCRIPTION OF THE DRAWINGS

FIG. 4 is a timing chart for explaining an operation of the drive circuit shown in FIG. 2;

FIG. 5 is a circuit diagram showing a modification of the drive circuit shown in FIG. 2;

FIG. 23 is a timing chart for explaining the operation when a drive circuit shown in FIG. 17 is driven by the trigger signal generator shown in FIG. 18;

DESCRIPTION OF THE PREFERRED EMBODIMENTS

Figure 1:
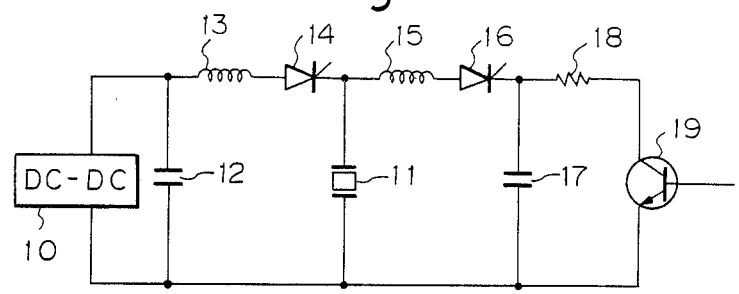
FIG. 1 is a circuit diagram of a basic arrangement of a control apparatus for an electroexpansive actuator according to one embodiment of the present invention.

FIG. 1 shows a basic arrangement of a control circuit for an electroexpansive actuator according to the present invention. An electroexpansive actuator 11 (hereinafter, actuator) receives a 300 V voltage generated from a DC-DC converter 10 through a coil 13 and a thyristor 14 after the voltage is temporarily accumulated in a capacitor 12. When the thyristor 14 is turned ON and the charge accumulated in the capacitor 12 flows through the actuator 11, and LC resonance is generated by the coil 13 and the actuator 11, and a maximum voltage of 500 V is then applied to the actuator 11 during the positive phase of the resonance. Thereafter, the thyristor 14 is automatically turned OFF by a negative phase of the LC resonance. The charge of the actuator 11 is discharged to a capacitor 17 through a coil 15 and a thyristor 16. The output voltage of the capacitor 17 can be controlled by a transistor 19 through a resistor 18. When the thyristor 16 is turned ON, the charge accumulated in the actuator 11 is discharged to the capacitor 17 in proportion to a potential difference between the actuator 11 and the capacitor 17. At this time, the coil 15 and the capacitor 17 cause an LC resonance, thus turning OFF the thyristor 16. The actuator 11 is expanded upon supply of the charge and is contracted upon discharge thereof. Therefore, the amount of contraction of the actuator 11 can be controlled by adjusting the voltage of the capacitor 17 by using the transistor 19.

Figure 2:
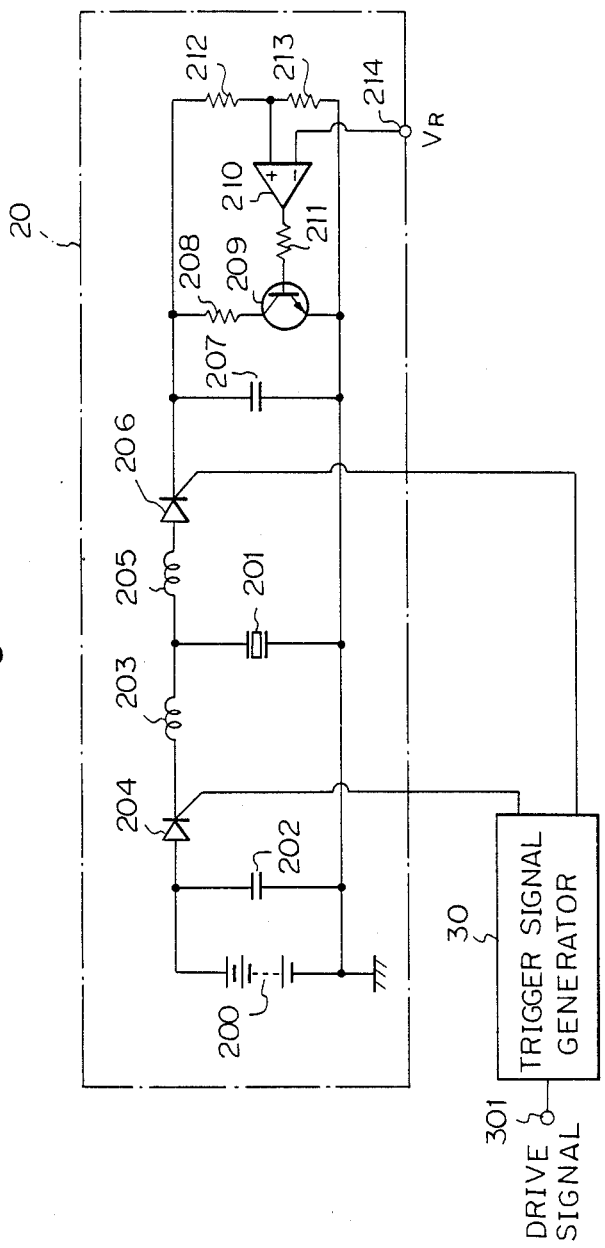
FIG. 2 is a circuit diagram of a drive circuit in the control apparatus according to one embodiment of the present invention.

FIG. 2 shows a drive circuit 20 in the control apparatus for the electroexpansive actuator according to one embodiment of the present invention. Referring to FIG. 2, reference numeral 200 denotes a high-voltage power supply for charging an actuator 201; and 202 denotes a large-capacity capacitor connected in parallel with the power source 200. The capacitor 202 supplies a large transient current necessary for driving the actuator 201. Reference numeral 204 denotes a first thyristor, the gate of which receives a first trigger signal from a trigger signal generator 30 (to be described later). Reference numeral 203 denotes a first coil having a given inductance. The capacitor 202, the first thyristor 204, the first coil 203, and the actuator 201 are connected with each other in series. Reference numeral 205 denotes a second coil, and 206 denotes a second thyristor, the gate of which receives a second trigger signal from the generator 30. Reference numeral 207 denotes a capacitor for discharging the charge accumulated in the actuator 201 by a predetermined amount. The capacitance of the capacitor 207 is about three times that of the actuator 201. The actuator 201, the second coil 205, the second thyristor 206, and the capacitor 207 are also connected with each other in series. Reference numeral 209 denotes a transistor for controlling the voltage of the capacitor 207, the collector of which is connected to the high-voltage side of the capacitor 207 through a current limiting resistor 208. Reference numeral 210 denotes an operational amplifier whose output is connected to the base of the transistor 209 through a resistor 211. The non-inverting input terminal of the operational amplifier 210 receives the voltage of the capacitor 207, which voltage is divided by resistors 212 and 213. The inverting input terminal of the amplifier 210 receives a reference voltage $V_R$ through an input terminal 214.

Figure 3:
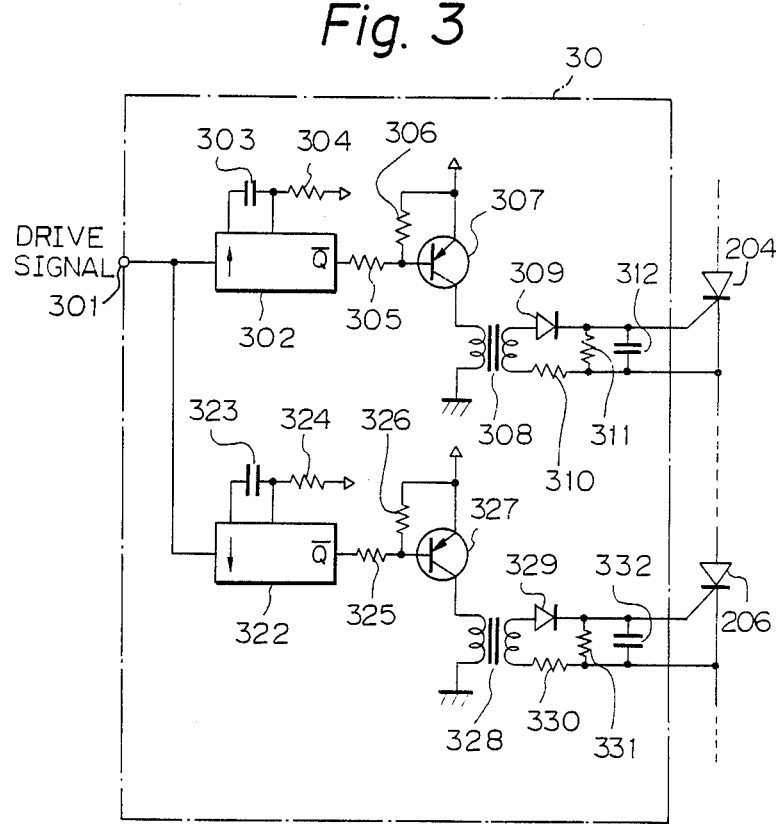
FIG. 3 is a circuit diagram of an example of a trigger signal generator shown in FIG. 2.

FIG. 3 shows an example of the circuit of the trigger signal generator 30 shown in FIG. 2. The trigger signal generator 30 receives a drive signal from an input terminal 301 thereof. A first one-shot multivibrator 302 is triggered in response to the leading edge of the drive signal, and generates as the $\overline{Q}$ output a "0" level signal whose pulse width (about 30 μsec) is determined by a capacitor 303 and a resistor 304. This output signal is supplied to the base of a transistor 307 through resistors 305 and 306. The emitter of the transistor 307 is connected to a power source (not shown), and the collector thereof is connected to the primary side of a pulse transformer 308. When the $\overline{Q}$ output of the multivibrator 302 is at "0" level, the transistor 307 is turn ON, and a current flows in the primary side of the transformer 308 to generator a signal (first trigger signal) from the secondary side thereof. The signal from the transformer 308 is supplied to the gate of the first thyristor 204 through a diode 309 and a resistor 310. Note that a resistor 311 and a capacitor 312 are also arranged to eliminate noise components. A second one-shot multivibrator 322 is triggered in synchronism with the trailing edge of the drive signal, and the second trigger signal is supplied to the gate of the second thyristor 206 by an identical circuit arrangement as above.

The operation of the drive circuit 20 will now be described. In FIG. 2, the drive signal is supplied from a control circuit (to be described later) and is assumed to be a pulse having a pulse width of 300 μsec and a frequency f. The trigger signal generator 30 generates the first trigger signal for triggering the first thyristor 204 in synchronism with the leading edge of the drive signal. The thyristor 204 is then turned ON to form a series resonance circuit consisting of the capacitor 202, the first thyristor 204, the first coil 203, and the actuator 201. The chaahrge from the capacitor 202 is then supplied to the actuator 201 to increase a terminal voltage thereof to about 1.5 times the power source voltage. In this way, the actuator 201 is expanded. When the charging of the actuator 201 is completed, the first thyristor 204 is automatically commutated, i.e, turned OFF. After a predetermined period of time (300 μsec), the generator 30 generates the second trigger signal to turn ON the second thyristor 206. Thus, a series resonance circuit consisting of the actuator 201, the second coil 205, the second thyristor 206, and the capacitor 207 if formed. Thereafter, since a sinusoidal current flows through this circuit and the charge accumulated in the actuator 201 is transferred to the capacitor 207, the terminal voltage of the actuator 201 is decreased, thus contracting the actuator 201.

The main feature of this control apparatus is to control an initial voltage in the capacitor 207. This operation will now be described with reference to FIG. 4. Assuming that the voltage of the capacitor 207 is 0 V when the second thyristor 206 is turned ON, and amount of voltage decrease in the actuator 201 becomes maximized (i.e., the voltage is decreased to a negative level) and the voltage of the capacitor 207 increases. In this case, the amount of contraction of the actuator 201 is at maximum. In this connection, if the second thyristor 206 is repeated to turn on in this state, charge mobility from the actuator 201 to the capacitor 207 is decreased, thus reducing the amount of the next contraction. Contrary to this, if the capacitor 207 is discharged by turning ON the transistor 209 until the next contraction, the actuator 201 can provide a maximum amount of contraction each time the actuator 201 contracts (see the left half of FIG. 4). Since the charging procedure of the actuator 201 remains the same during each operation, if the physical length of the actuator 201 when expanded is the same, the expansion/contraction stroke of the actuator 201 will be determined by the amount of contraction. In the above example, the voltage of the capacitor 207 is assumed to be 0 V. However, if the initial voltage of the capacitor 207 is gradually increased, the charge mobility from the actuator 201 to the capacitor 207 is reduced when the second thyristor 206 is turned ON, thus decreasing the amount of contraction of the actuator 201. Therefore, the expansion/contraction stroke thereof also will be decreased (see the right half of FIG. 4). This initial voltage of the capacitor 207 is controlled by turning ON the transistor 209 through the resistor 208.

In FIG. 2, the voltage of the actuator 201 is divided to 1/100 by the resistors 212 and 213, and is the supplied to the non-inverting input terminal of the operational amplifier 210. A reference voltage $V_R$ is supplied to the inverting input terminal of the operational amplifier 210. When the voltage of the capacitor 207 is higher than the reference voltage $V_R \times 100$, the output of the operational amplifier 210 increases so as to turn ON the transistor 209 through the resistor 211 and to discharge the capacitor 207 through the resistor 208 to decrease the voltage thereof. When the voltage of the capacitor 207 becomes lower than the voltage $V_R \times 100$, the output of the operational amplifier 210 decreases, and the transistor 209 is turned OFF. Then, the voltage of the capacitor 207 no longer can be decreased. Therefore, the voltage of the capacitor 207 is controlled to be maintained at $V_R \times 100$. The resistance value of the resistor 208 is determined to be, for example, 200Ω, by the capacitance (about 1.5 μF) of the capacitor 207 and the maximum frequency (500 Hz) of the drive signal so as to obtain a time constant for completing voltage control of the capacitor 207 until the next cycle. Thus, when the voltage $V_R$ is varied in accordance with the above operation, the initial voltage of the capacitor 207 can be changed, and therefore, the amount of contraction (i.e., the expansion/contraction stroke) of the actuator 201 can be controlled.

FIG. 5 shows a modification of the drive circuit shown in FIG. 2. In a drive circuit 20', a coil 203' is provided instead of the first and second coils 203 and 205 is FIG. 2, and serves the same role as the above.

In the drive circuits shown in FIGS. 2 and 5, transistors, FETs, GTOs, and the like can be used instead of the first and second thyristors 204 and 206, and a FET, a GTO and the like can be used instead of the transistor 209.

Figure 6:
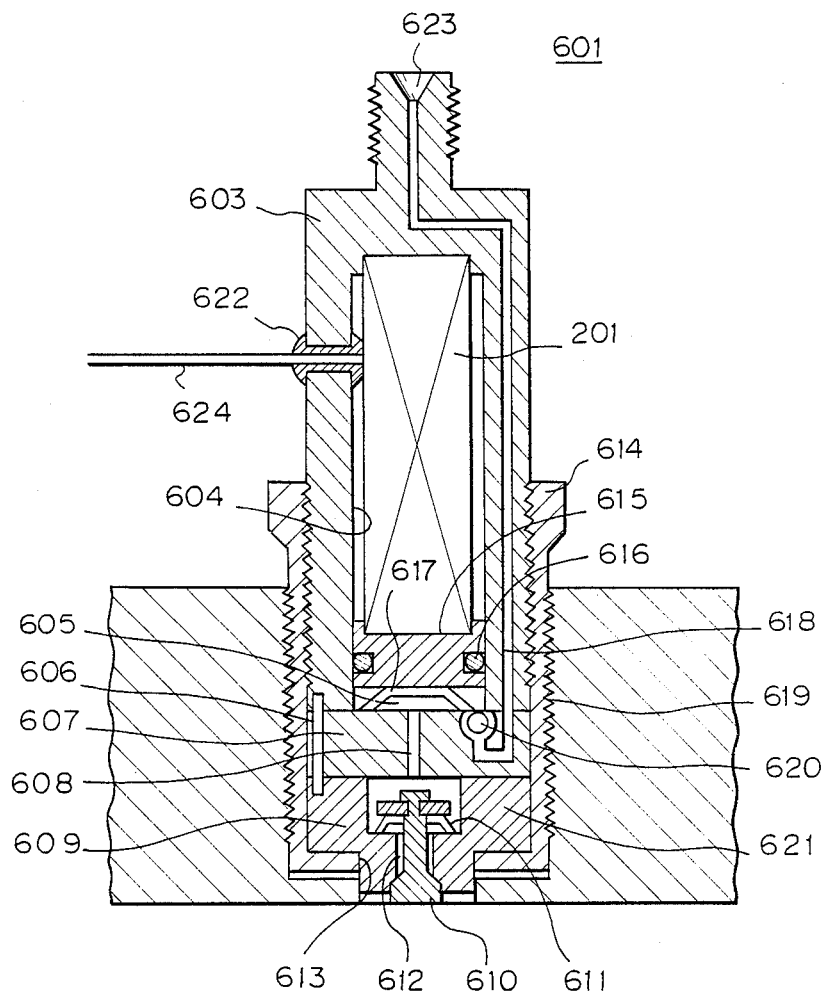
FIG. 6 is a side sectional view of a fuel injection valve to which the control apparatus shown in FIG. 2 is applied.

FIG. 6 is a side sectional view showing a fuel injection valve for a gasoline engine to which the control apparatus shown in FIG. 2 is applied. Referring to FIG. 6, a fuel injection valve 601 is driven upon expansion/contraction of an electroexpansive actuator 201. The actuator 201 is constituted by stacking disk-shaped electroexpansive elements one upon the other into a columnar shape. When a 500 V voltage is applied to each element in the direction of its thickness, the element expands by about 0.5 μm, and when a −500 V voltage is applied thereto, contracts by about 0.5 μm. Therefore, if 100 elements are stacked one upon the other, they can provide an expansion/contraction stroke 100 times that of a single element. Each element comprises a ceramic obtained by sintering zirconium lead titanate, and silver electrodes are formed on two surfaces thereof. A lead wire 624, used for applying a voltage, extends through an upper casing 603 through a grommet 622, and is then connected to the drive circuit 20. The expansion/contraction operation of the actuator 201 is thus transmitted directly to a piston 615 to reciprocate the piston 615.

The piston 615 slidably moves inside a cylinder 604 of the upper casing 603 to increase and decrease a volume of a pump chamber 605 as a pump. A Belleville spring 617 is arranged in the pump chamber 605 to bias the piston 615 in the contraction direction of the actuator 201, because a contraction force of the actuator 201 is weaker than its expansion force. When the volume of the pump chamber 605 increases, external fuel is taken in through a check valve 620. In this case, an intake path 618 is arranged in the interior of a wall constituting the upper casing 603. The check valve 620 is provided in a distance piece 607 in order to separate the pump chamber 605 from an injection valve 609.

The injection valve 609 is an externally opening single-hole nozzle consisting of a nozzle body 621 and a needle 610. The needle 610 is biased by the spring 611 so as to close an injection opening 612. However, when the pump chamber 605 contracts, pressure of a fuel supplied via an outlet opening 608 of a distance piece 607 pushes the needle 610 to open the injection opening 612, and is injected externally. The upper casing 603, the distance piece 607, and the nozzle body 621 have the same diameter, are stacked in that order, and are pressed and fixed by a bag-like lower casing 614 in the axial direction. A female screw of the lower casing 614 is engaged with a male screw of the upper casing 603. A hole 613 is formed in the lower end of the lower casing 614, and the injection opening 612 is exposed therethrough. A male screw 619 provided around the outer periphery of the lwoer casing 614 is engaged with an internal combustion engine 700. Note that reference numeral 616 denotes an O-ring and 623 a fuel inlet opening formed in the upper casing 603.

An amount of fuel injected from the injection valve 601 per stroke is determined by the stroke of the actuator 201, and the stroke is determined by a voltage applied to the actuator 201. Assume that 10 mg of fuel is injected per stroke when the application voltage is switched from −500 V to +500 V, and that 4 mg of fuel is injected per stroke when switched from −300 V to +300 V. The application voltage has no linear relationship with respect to the fuel injection amount since the fuel injection amount depends not only on the amount of expansion of the actuator but also on ineffective factors such as a dead volume in the pump chamber, power loss, and the like.

Figure 7:
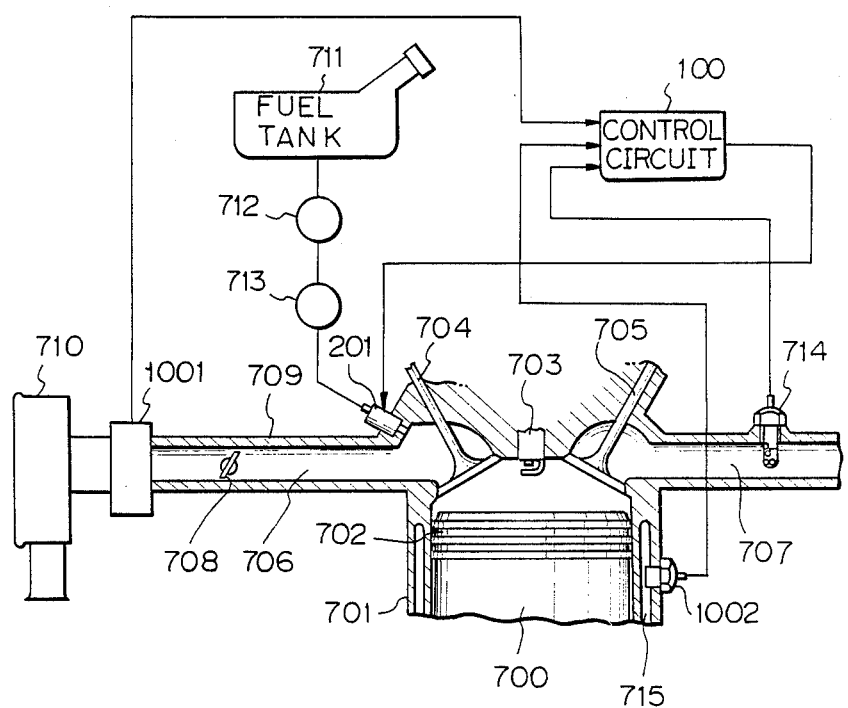
FIG. 7 is a schematic illustration of an internal combustion engine including the fuel injection valve shown in FIG. 6.

FIG. 7 schematically shows the overall arrangement of an internal combustion engine including the fuel injection valve shown in FIG. 6. Referring to FIG. 7, reference numeral 700 denotes an internal combustion engine consisting of, as is well known, a cylinder block 701, a piston 702, a spark plug 703, an intake valve 704, an outlet valve 705, an intake pipe 706, an outlet pipe 707, and the like. A throttle valve 708 is arranged in the intake pipe 706 and the fuel injection valve 601 is arranged on a pipe wall 709 of the pipe 706. The valve 601 can be arranged either upstream or downstream of the throttle valve 708. The intake pipe 706 communicates with an outer atmosphere through an air cleaner 710, downstream of which an air-amount sensor 1001 is provided.

Various types of sensors are commercially available for the air-amount sensor 1001, and a sensor of any type can be used. The engine of this embodiment adopts an air-flow meter comprising a hot-wire anemometer which generates a voltage proportional to a wind speed, i.e., an amount of intake air. A principle and structure of the hotwire anemometer are known to those skilled in the art, and a description thereof is omitted. The output from the air-amount sensor 1001 is supplied to a control circuit 100.

The fuel injection valve 601 receives fuel from a fuel tank 711 through a feed pump 713 and a filter 712. The feed pump 713 is a known type (e.g., a diaphragm or electromagnetic type), which stops operation when a delivery pressure exceeds a preset value. Either type of the pump can be adopted, and the delivery pressure is set at 0.5 kg/cm$^2$. Although not shown, a reservoir or accumulator is provided preferably between the feed pump 713 and the valve 601. Alternatively, a sufficient head is provided between the fuel tank 711 and the valve 601 without using the feed plump 713, or the fuel tank 711 can be compressed.

A water jacket 715 is formed inside the cylinder block 701, and a water-temperature sensor 1002 for detecting a cooling water temperature is arranged to be exposed in the water jacket 715. The output signal from the sensor 1002 is supplied to the control circuit 100. An $O_2$ sensor 714 is arranged in the outlet pipe 707, as needed. The output signal from the control circuit 100 is supplied to the valve 601 to drive the actuator 201.

Figure 8:
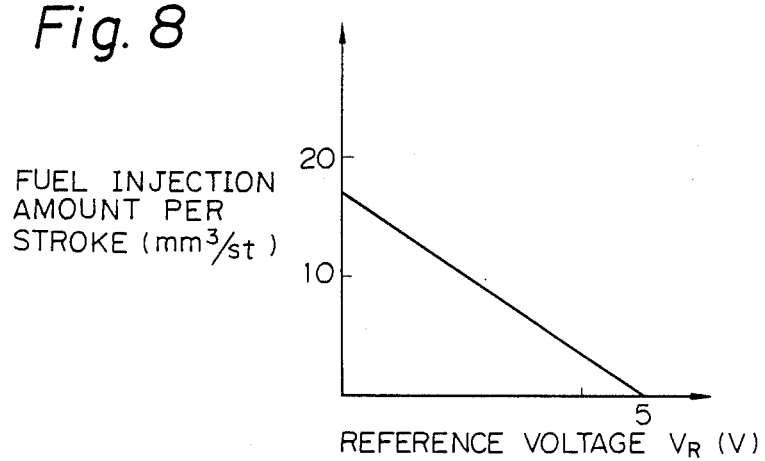
FIG. 8 is a graph showing the relationship between a reference voltage and an amount of fuel injected from the fuel injection valve when the circuit shown in FIG. 2 is used.

FIG. 8 shows the relationship between the reference voltage $V_R$ and the fuel injection amount when the control apparatus shown in FIG. 2 is applied to the fuel injection valve shown in FIG. 6. When the voltage $V_R$ is 0 V, the expansion/contraction stroke and the fuel injection amount is maximum, and the fuel injection amount decreases as the voltage $V_R$ incrases. Thus, even if the power source voltage in constant, when the reference voltage $V_R$ is changed, the fuel injection amount per stroke can be accurately and smoothly varied, thus significantly widening a dynamic range of an injector.

Figure 9:
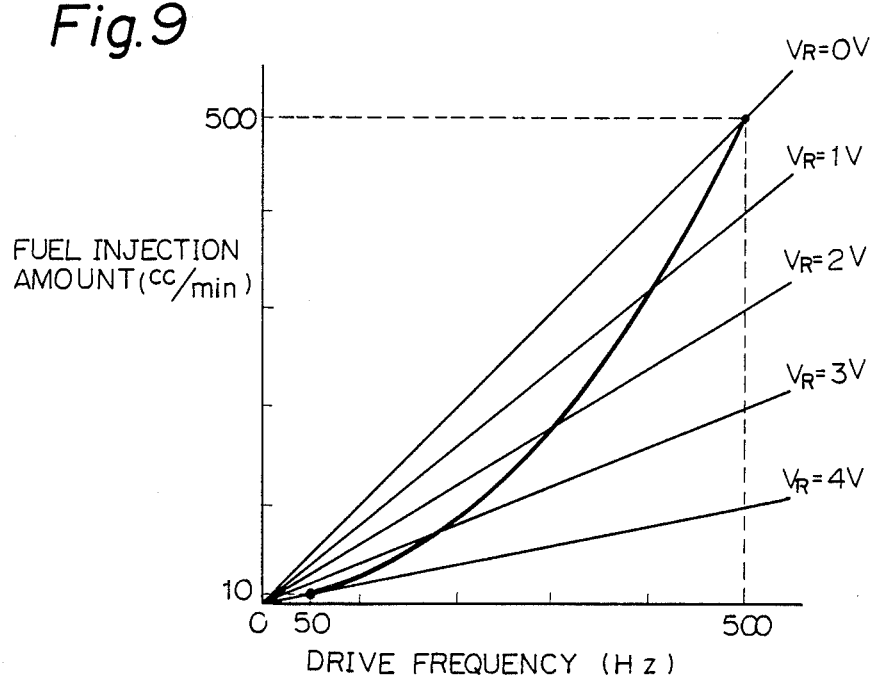
FIG. 9 is a graph showing the relationship between a drive frequency and the amount of fuel injected from the fuel injection valve when the valve is driven by the drive circuit shown in FIG. 2.

FIG. 9 shows an example of detailed injection control. Assume that a minimum drive frequency is set at 50 Hz even in an idling mode requiring a minimum fuel injection amount, in order to effectively use a high-response characteristic of the electroexpansive actuator, and a maximum drive frequency is set at 500 Hz because of limitations in, e.g., a power source capacity, a response characteristic of the check valve, and the like. In this case, the maximum drive frequency is only ten times the minimum drive frequency. If the engine requires a dynamic range of the fuel injection amount varying between a minimum of 10 cc/min to a maximum of 500 cc/min (i.e., 50 times), this requirement cannot be satisfied. When the reference voltage $V_R$ is changed by the drive circuit described above to widen the dynamic range 5 times, the requirement of the 50-times dynamic range can be satisfied. FIG. 9 reveals that the 50-times dynamic range can be achieved if the maximum drive frequency is set at 500 Hz and the voltage $V_R$ is set at 0 V when the fuel injection amount is a maximum of 500 cc/min, and if the minimum drive frequency is set at 50 Hz and the voltage $V_R$ is set at 4 V when the fuel injection amount is a minimum of 10 cc/min. The drive frequency and the reference voltage $V_R$ are changed to moderate a curve between the maximum and the minimum fuel injection amounts.

Figure 10:
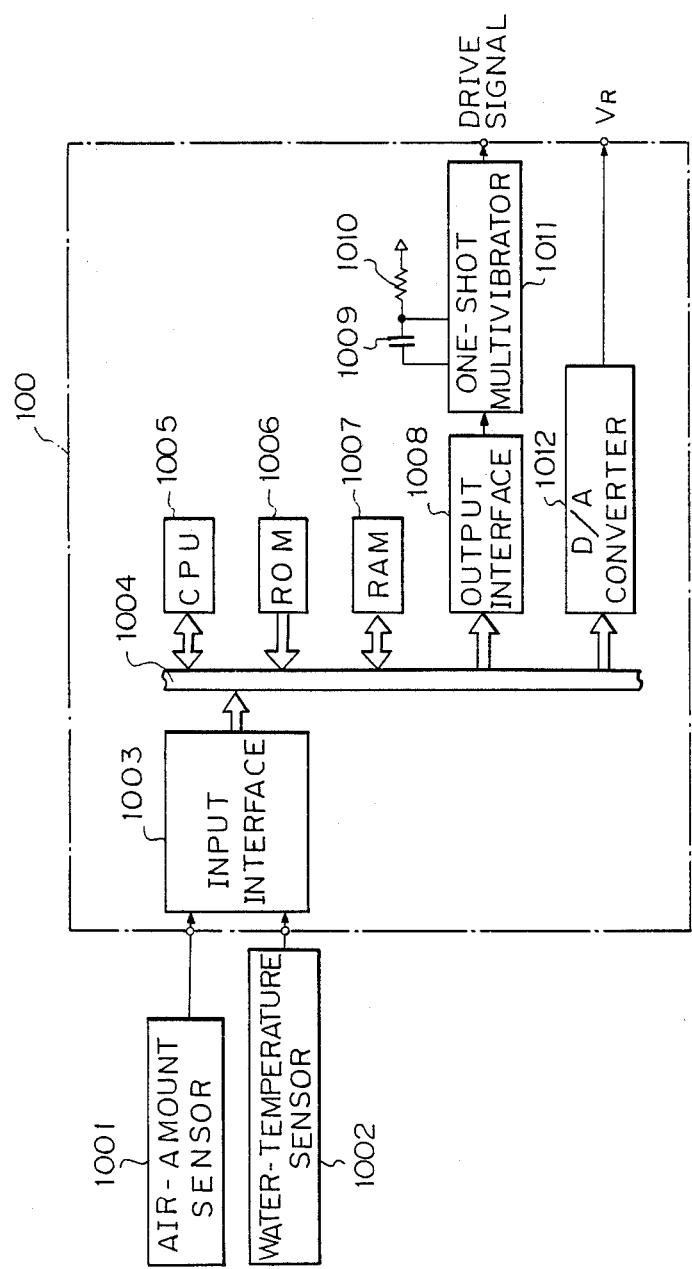
FIG. 10 is a block diagram of a circuit for operating and generating the reference voltage and a drive signal for controlling the fuel injection valve.

FIG. 10 shows an operational control circuit 100 which performs the above control. Reference numeral 1001 denotes a known type (e.g., a vane or hot-wire type) air-amount sensor, which measures an amount of intake air in the engine. Reference numeral 1002 denotes a water-temperature sensor, mounted on the engine, for measuring a cooling water temperature. An input interface 1003 coverts the outputs from the sensors 1001 and 1002 into digital signals and supplies the ditital signals to a bus line 1004. Reference numeral 1005 denotes a CPU for operational control; 1006, a ROM storing a program and various data; and 1007, a RAM. An output interface 1008 loads a digital value corresponding to a drive frequency calculated by the CPU 1005 to produce the drive frequency signal. Reference numeral 1011 denotes a one-shot multivibrator, which produces a drive signal having a constant pulse width synchronous with the drive frequency signal. The pulse width of the drive signal is determined at, e.g., 300 $\mu$sec, by a time constant of a capacitor 1009 and a resistor 1010. Reference numeral 1012 denotes a D/A converter for converting the digital value corresponding to the reference voltage $V_R$ calculated by the CPU 1005 into an analog voltage, and supplies the analog signal to the drive circuit 20.

Figure 11:
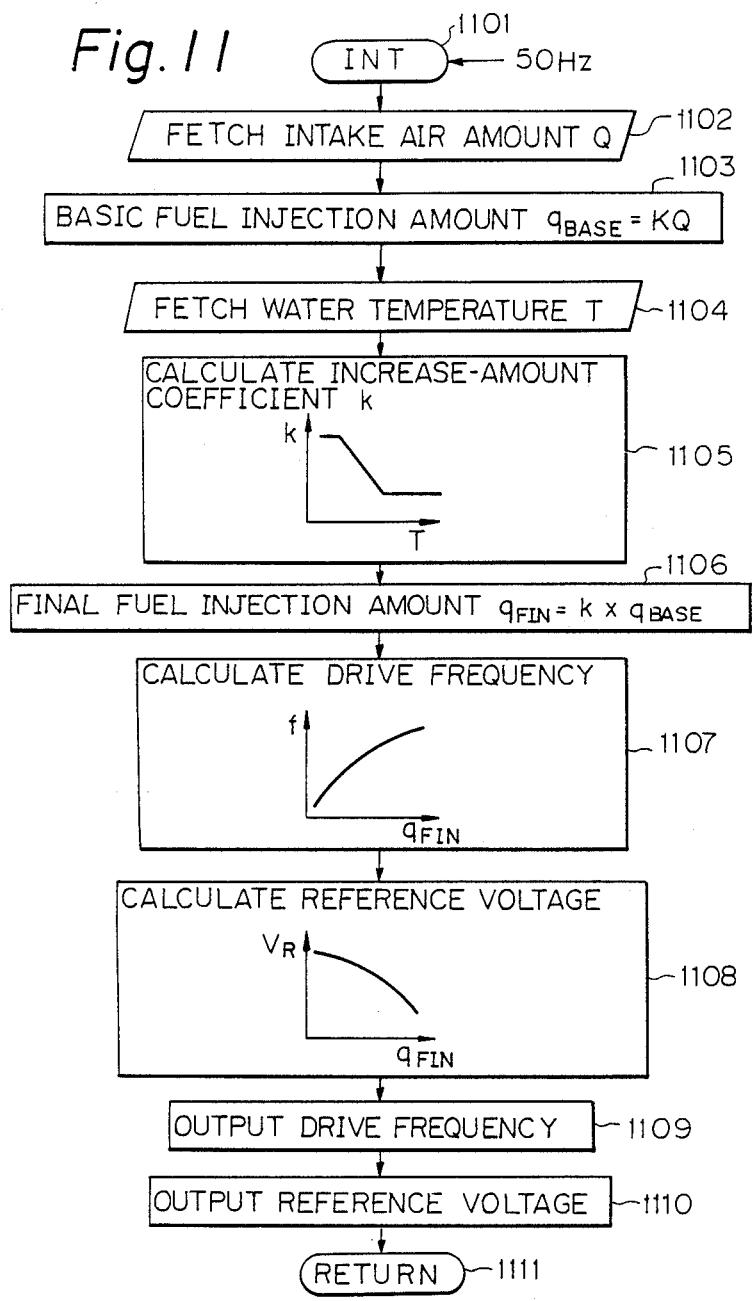
FIG. 11 is a flow chart showing an operation sequence of the drive signal frequency and the reference valtage.

The operation of the control circuit 100 will be described with reference to the flow chart shown in FIG. 11. A control routine for the fuel injection amount is energized by an interrupt signal at 50 Hz corresponding to the minimum drive frequency (step 1101). An intake air amount Q is fetched from the input interface 1003 (step 1102). A basic fuel injection amount $q_{BASE}$ corresponding to a predetermined air-fuel ratio is calculated from the amount Q (step 1103). Then, a cooling water temperature is fetched from the input interface 1003 (step 1104), and an increase-amount coefficient K is obtained from increase-amount map data stored in the ROM 1006 corresponding to the sensed water temperature (step 1105). Then, a final fuel injection amount $q_{FIN}$ ($=k \times q_{BASE}$) is calculated (step 1106). Then, the drive frequency f and the reference voltage $V_R$ are obtained with reference to the drive frequency map and the reference voltage map stored in the ROM 1006 on the basis of the above FIG. 9 (steps 1107 & 1108). Finally, after the drive frequency data is supplied to the output interface 1008 and the reference voltage data is supplied to the D/A converter 1012, then the flow returns (steps 1109 through 1111). Thereafter, the drive signal and the reference voltage $V_R$ are produced by the above-mentioned arrangement to perform predetermined injection.

Therefore, with the above control apparatus for the fuel injection valve, even if the power source voltage is constant, since the expansion/contraction stroke can be freely electrically controlled with a high response, the fuel injection amount per stroke of the fuel injection valve can be varied, and its dynamic range can be significantly widened.

Figure 12:
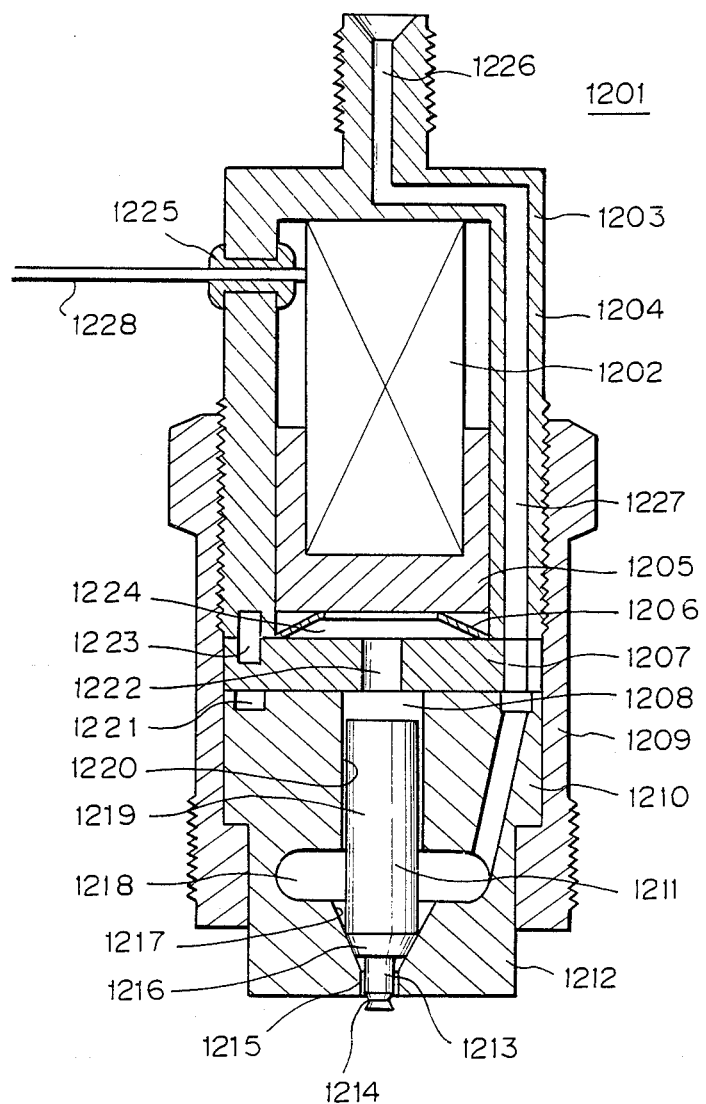
FIG. 12 is a sectional view of another fuel injection valve to which the control apparatus of the present invention is applied.

FIG. 12 shows an example of a fuel injection valve for a diesel engine to which the above-mentioned control apparatus is applied, and which injects fuel at each specific phase angle of the engine. A casing 1203 of a fuel injection valve 1201 consists of a nozzle holder 1204, and a retaining nut 1209. The casing 1203 houses an actuator 1202, a pump piston 1205, a Belleville spring 1206, a distance piece 1207, and a nozzle complete 1210 from upper side. The nozzle complete 1210 is constituted by a nozzle body 1212 and a nozzle needle 1211. An axial through hole 1208 having a nonuniform diameter extends through the center of the nozzle body 1212, and each portion thereof forms a needle guide 1220, a fuel reservoir 1218, a seat portion 1217, and an injection opening 1215 from the upper side. Note that the seat portion 1217 has a conical shape. The nozzle needle 1211 is movable in the through hole 1209 in the axial direction thereof. The nozzle needle 1211 consists of a large-diameter portion 1219, a conical portion 1216, and a small-diameter protion 1213. The large-diameter portion 1219 can be slidably moved in the needle guide 1220 to be separated from the wall thereof by a gap of 20 $\mu$m in consideration of diameter. When the conical portion 1216 is in contact with the seat portion 1217, communication between the reservoir 1218 and the opening 1215 is interrupted. Note that the conical portion 1216 is in line contact with the seat portion 1217, and its contact portion is a portion nearest the small-diameter portion 1213. When the conical portion 1216 is in line contact with the seat portion 1217, the small diameter portion 1213 virtually extends through the opening 1215, and a gap of about 50 $\mu$m (in diameter) is formed therebetween. The distal end of the small-diameter portion 1213 has a notch 1214 for injecting fuel in a conical shape. Although the nozzle needle 1211 is movable in the axial direction, its lower limit position is defined when the conical portion 1216 is in contact with the seat portion 1217, and the its upper limit position is defined when the upper end face of the large-diameter portion 1219 is in tight contact with the lower end face of the distance piece 1207. A through hole 1222 is formed in the distance piece 1207 to be coaxial with the through hole 1208 of the nozzle body 1212. When the nozzle needle 1211 reaches its upper limit position, the through hole 1222 is closed by the upper end face of the nozzle needle 1211. A space 1224 for the Belleville spring 1206 is formed in the nozzle holder 1204 between the upper surface of the distance piece 1207 and the lower surface of the pump piston 1205. The space 1224 forms a pump chamber 1224. The pressure in the pump chamber 1224 is increased or reduced upon expansion/contraction of the actuator 1202. The pressure in the pump chamber 1224 acts on the upper end face of the nozzle needle 1211 through the through hole 1222 to move it vertically. The actuator 1202 is constituted by alternately laminating disk-shaped elements and foil-like electrodes into a columnar shape, and a voltage is applied to each disk-shaped element. A lead wire 1228 for voltage application is guided outside the nozzle holder 1204 through a grommet 1225, and is connected to a control circuit (to be described later). Compressed fuel (e.g. at 200 kg/cm$^2$) is continuously supplied to the injection valve 1201 by, e.g., a high-pressure pump, a pressure regulator, an accumulator, or the like. The fuel reaches the fuel reservoir 1218 from an intake port 1226 via a path 1227 extending through the nozzle holder 1204, the distance piece 1207, and the nozzle body 1212. The fuel is then injected externally through the injection opening 1215 unless the conical portion 1216 of the nozzle needle 1211 is in contact with the seat portion 1217 of the nozzle body 1212. In order to form the path 1227, a knock pin 1223 is used so as not to change the position of the nozzle holder 1204 relative to the distance piece 1207, and a ring-shape groove 1221 is formed in the nozzle body 1212, so that the position of the distance piece 1207 relative to the nozzle body 1212 can be changed.

At the beginning of use of the injection valve 1201 in FIG. 12, fuel at the pressure of 200 kg/cm$^2$ is first supplied by an external pressure source, reaches the fuel reservoir 1218 through the path 1227, and acts on the conical portion 1216 of the nozzle needle 1211 to lift it up. However, the compressed fuel in the reservoir 1218 also reaches the pump chamber 1224 through the 20 $\mu$m gap between the large-diameter portion 1219 and the guide portion 1220 and the through hole 1222 of the distance piece, and acts on the upper end face of the nozzle needle 1211 to move it downward. Therefore, the nozzle needle 1211 is brought into contact with the seat portion 1217 due to a difference between their pressure-receiving areas and closes the opening 1215. Then, the supplied fuel no longer can be injected from the opening 1215.

Figure 13:
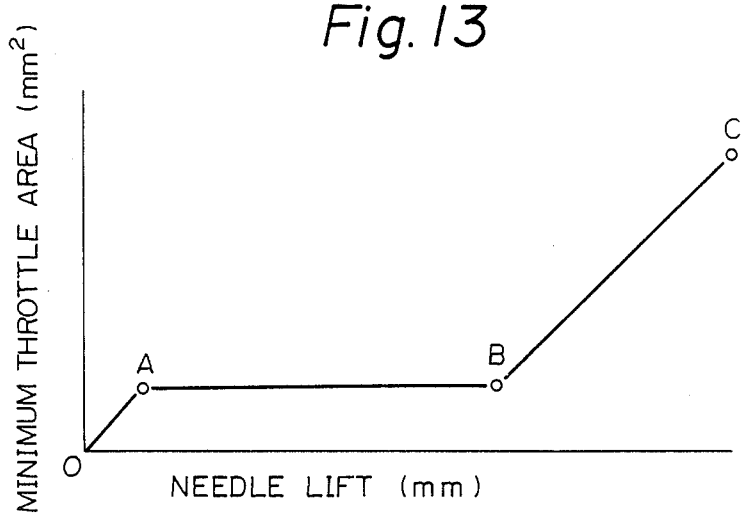
FIG. 13 is a graph showing the relationship between an amount of lift of a nozzle needle and a minimum throttle area of a fuel path in the fuel injection valve.

When the control apparatus shown in FIG. 1 is applied to the fuel injection valve shown in FIG. 12, the DC-DC converter 10 raises a battery voltage of 12 V to 300 V to charge the capacitor 12. When the thyristor 14 is turned on, a 500 V voltage is applied to the actuator 11 to expand it. Thereafter, the injecton valve 1201 and the control apparatus shown in FIG. 1 await an injection start instruction. This instruction is obtained by turning ON the thyristor 16. When the thyristor 16 is turned ON, almost all of the charge accumulated in the actuator 11 is transferred to the capacitor 17, and the actuator 11 is contracted accordingly to reduce the pressure in the pump chamber 1224. Thereby, a force acting on the upper end face of the nozzle needle 1211 becomes weaker than that acting on the conical portion 1216, and the nozzle needle 1211 is lifted up, so that its upper end face is brought into contact with the lower end face of the distance piece 1207 and is fixed in that position. At this time, the compressed fuel in the fuel reservoir 1218 is injected externally, e.g., into the combustion chamber of the diesel engine through the gap between the conical portion 1216 and the seat portion 1217 and through the gap between the small-diameter portion 1213 and the injection opening 1215. An injection end instruction is obtained by turning ON the thyristor 14. When the thyristor 14 is turned ON, a charge accumulated in the capacitor 12 is transferred to the actuator 11 to expand it, and the pressure in the pump chamber 1224 is increased, so that the nozzle needle 1211 is brought into contact with the seat portion 1217, thus completing a cycle of injection. The fuel injection amount is controlled by an injection period, and this fact is known to those skilled in the art. However, the above embodiment of the present invention has a feature whereby two different gap areas between the opening 1215 and the small-diameter portion 1213 can be selected to change the fuel injection amount. In FIG. 13, an amount of lift of the nozzle needle 1211 (i.e., an axial distance from the lower limit position of the nozzle needle 1211 to a current position of the nozzle needle 1211) is plotted along the abscissa, and a minimum throttle area of the path of injected fuel is plotted along the ordinate. An origin 0 represents a state where the nozzle needle 1211 is brought into contact with the seat portion 1217, and the gap between the conical portion 1216 and the seat portion 1217 forms a minimum throttle between points O and A. A portion of the small-diameter portion 1213 other than the notch 1214 is located inside the opening 1215 between points A and B, and the gap area between the small-diameter portion 1213 and the opening 1215 is constant to form a minimum throttle irrespective of the lift of the nozzleneedle 1211. The portion of the small-diameter portion 1213 other than the notch 1214 is being separated from the opening 1215 between points B and C, thus gradually increasing a throttle area. A point C represents a state where the upper end of the nozzle neelde 1211 abuts against the lower end of the distance piece 1207. In curve O-A-B-C of FIG. 13, the stable minimum throttle area can be obtained at the origin 0, between the points A and B, and at the point C. The feature of this embodiment is that the two throttle areas between the points A and B and at the point C are selectively used to control the fuel injection amount. The transistor 19 in the control apparatus of FIG. 1 is operated in order to obtain the amount of lift between the points A and B. After the valve 1201 completes the injection, the capacitor 17 is fully charged by the charge supplied from the actuator 11, and provides a terminal voltage of, e.g., 400 V. When the capacitor 17 is completely discharged by the transistor 19, the nozzle needle 1211 can be lifted up to the point C. However, when the transistor 19 only discharges the capacitor 17 until a residual potential of the capacitor 17 becomes 200 V, the actuator 11 cannot be sufficiently contracted for the next injection, and the amount of lift of the nozzle needle 1211 can be retained between the points A and B. The residual potential of the capacitor 17 can be predetermined in order to retain the nozzle needle between the points A and B. However, it is more preferable to perform a learning control such that the residual potential of the capacitor 17 is increased from 0 V in increments of 10 V per injection cycle, and a decrease in engine speed or power is monitored so as to obtain a proper residual potential when the decrease is stopped, i.e., at the point B. The point B is more preferable to the point A since the compressed fuel in the fuel reservoir 1218 enters the pump chamber 1224 through the gap between the large-diameter portion 1219 and the guide portion 1220 during lifting of the nozzle needle 1211, and this eliminates an adverse influence when the nozzle needle 1211 moves downward. Note that an accelerator opening degree is detected, and the transistor 19 discharges the capacitor 17 so that the needle 1211 is lifted up to the point B when the detected opening degree is lower than a preset value; otherwise, it is lifted up to the point C.

Figure 14:
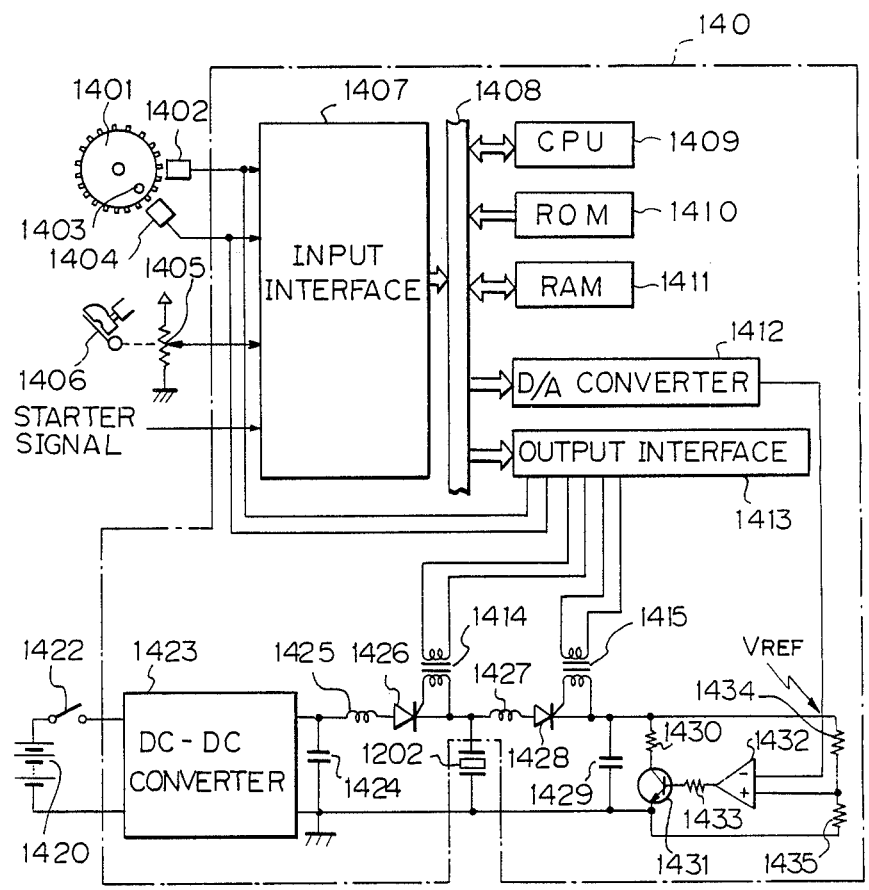
FIG. 14 is a circuit diagram of a detailed arrangement of an example of a control circuit used in the control apparatus of the present invention.

A control circuit for the above-mentioned control will now be described. FIG. 14 is a block diagram showing an arrangement of a control circuit 140. Reference numeral 1407 denotes an input interface having the following function. 720 projections are formed at equal intervals on an outer peripheral portion of a signal plate 1401, which is mounted on a cam shaft of an engine (not shown). The projections are detected by an angle sensor 1402. More specifically, a single output pulse from the angle sensor 1402 corresponds to an engine crank angle 1° CA. A single projection 1403 indicating a reference position is formed on the signal plate 1401, and is detected by a reference sensor 1404. The output signals from the sensors 1402 and 1404 are supplied to the input interface 1407, and are then supplied to a bus line 1408 as engine speed data. Reference numeral 1405 denote an accelerator opening degree sensor, which converts an accelerator opening degree, by means of a potentiometer 1405 interlocked with an accelerator pedal 1406, into a voltage and supplies it to the input interface 1047. The input interface 1407 converts the input voltage into digital value and supplies it to the bus line 1408. The input interface 1407 also receives a starter signal which goes to the ON state in response to the starting of a starter, and also supplies it to the bus line 1408. Reference numeral 1409 denotes a CPU for operational control. Reference numeral 1410 denotes a ROM storing a program and various data; and 1411, a RAM for operating and storing data from the CPU 1409. Reference numeral 1408 denotes the bus line for data communication. Reference numeral 1412 denote a D/A converter for generating a reference voltage calculated by the CPU 1409. Reference numeral 1413 denotes an output interface for controlling the injection valve 1201. When an injection period τ and an injection timing θinj calculated by the CPU 1409 are set, trigger signals for triggering first and second thyristors 1426 and 1428 are generated at a predetermined timing based on the reference and angle signals.

A drive circuit will now be described in detail. The output from a battery 1420 is supplies to a DC-DC converter 1423 through a key switch 1422, a high voltage of a 300 V is always accumulated in a large-capacitance capacitor 1424. The high voltage is supplied to the actuator 1202 through a serial circuit consisting of a first coil 1425 and the first thyristor 1426. The gate of the first thyristor 1426 receives a first trigger signal from the output interface 1413 through an insulating pulse transformer 1414. The actuator 1202 is connected to a capacitor 1429 through a serial circuit consisting of a second coil 1427 and the second thyristor 1428. The gate of the second thyristor 1428 also receives a second trigger signal from the output interface 1413 through the transformer 1415. The capacitor 1429 is connected in parallel with a transistor 1431 through a resistor 1430. The base of the transistor 1431 is connected to the otuput terminal of a comparator 1432 through a resistor 1433. The non-inverting input of the comparator 1432 receives a voltage of the capacitor 1429 divided to 1/100 by resistors 1434 and 1435, and the inverting input thereof receives the output voltage from the D/A converter 1412 as a reference voltage $V_{REF}$. The operation of this portion will be explained below. When the second thyrisor 1428 is triggered, the charge (the voltage is nearly equal to 500 V) accumulated in the actuator 1202 is transferred to the capacitor 1429 through the second coil 1427 and the second thyristor 1428, and the voltage of the capacitor 1429 is increased to about 400 V. The voltage is divided to 1/100 by the resistors 1434 and 1435 and supplied to the non-inverting input of the comparator 1432. If a constant voltage of, e.g., 2 V, is applied to the inverting input of the comparator 1432 as the reference voltage $V_{REF}$, the output voltage therefrom goes to "1" level, and turns on the transistor 1431 through the resistor 1433. Thus, the capacitor 1429 is discharged through the resistor 1430 and the voltage thereof drops. When the voltage of the capacitor 1429 decreases to 200 V, since the output voltage from the comparator 1432 goes to "0" level, the transistor 1431 is turned OFF, and the capacitor 1429 no longer can be discharged and the potential is maintained. More specifically, the resultant voltage of the capacitor 1429 is controlled to be $V_{REF} \times 100$ V. When the voltage $V_{REF}$ is set at 0 V, since the voltage of the capacitor 1429 is decreased to 0 V, a potential difference between the actuator 1202 and the capacitor 1429 becomes large when the second thyristor 1428 is triggered. Thus, a large amount of charges flow from the actuator 1202 to the capacitor 1429, and the amount of contraction of the actuator 1202 becomes maximum. Conversely, when the voltage $V_{REF}$ is increased, the potential of the capacitor 1429 is also increased, and the amount of charges moved from the actuator 1202 is decreased, thus decreasing the amount of contraction.

The first and second thyristors 1426 and 1428 in the above drive circuit can be replaced with transistors. In this case, the coils 1425 and 1427 need not be always used.

Figure 16:
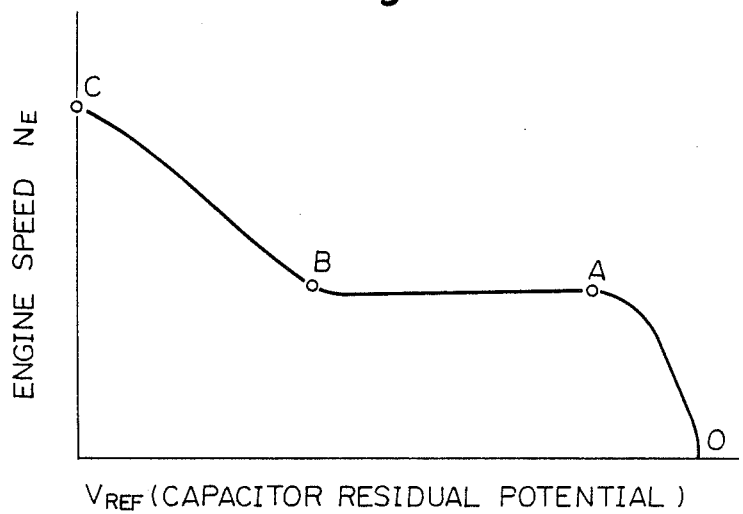
FIG. 16 is a graph showing the relationship between an engine speed and a residual voltage of a charge discharging capacitor used in the control circuit shown in FIG. 14.
Figures 2, 15A:
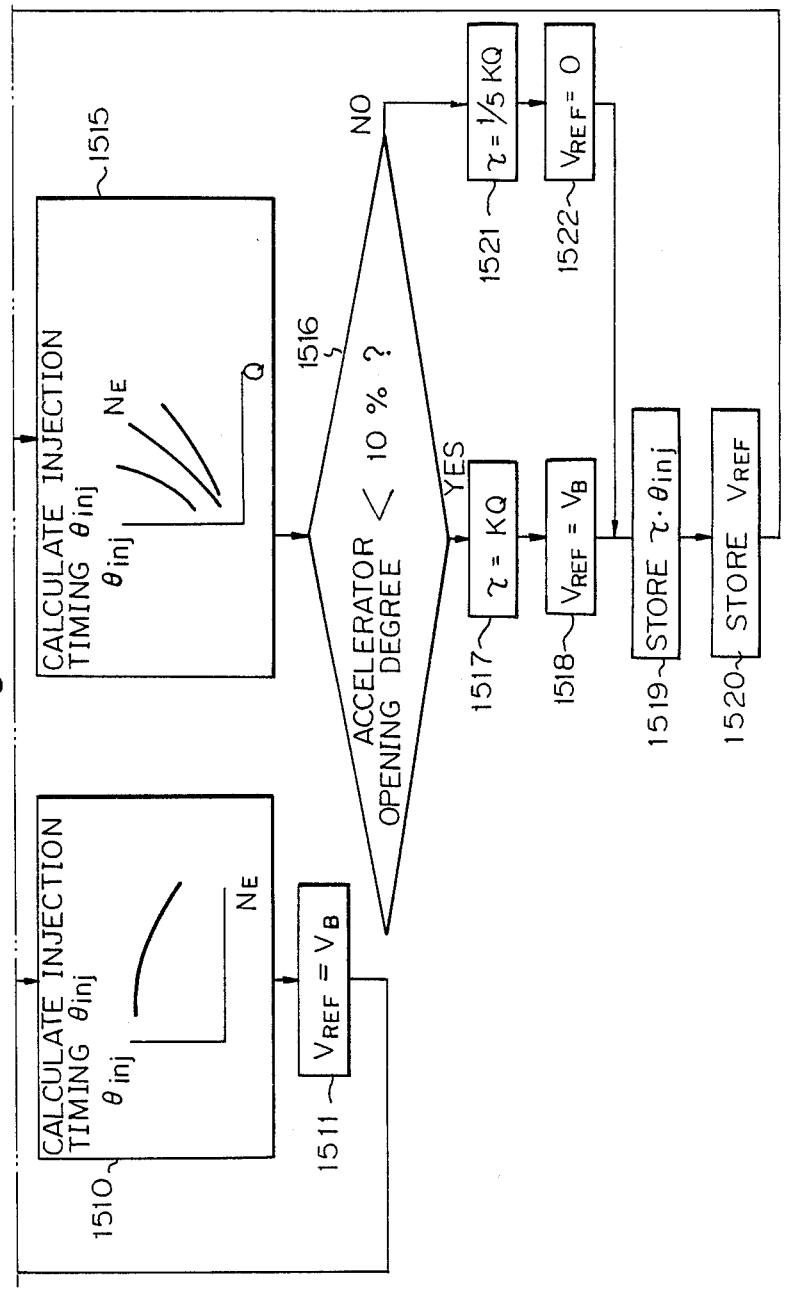
FIGS. 15(A), 15(A-1), 15(A-2), and 15(B) are flow charts for explaining the operation of the control circuit shown in FIG. 14.
Figure 15B:
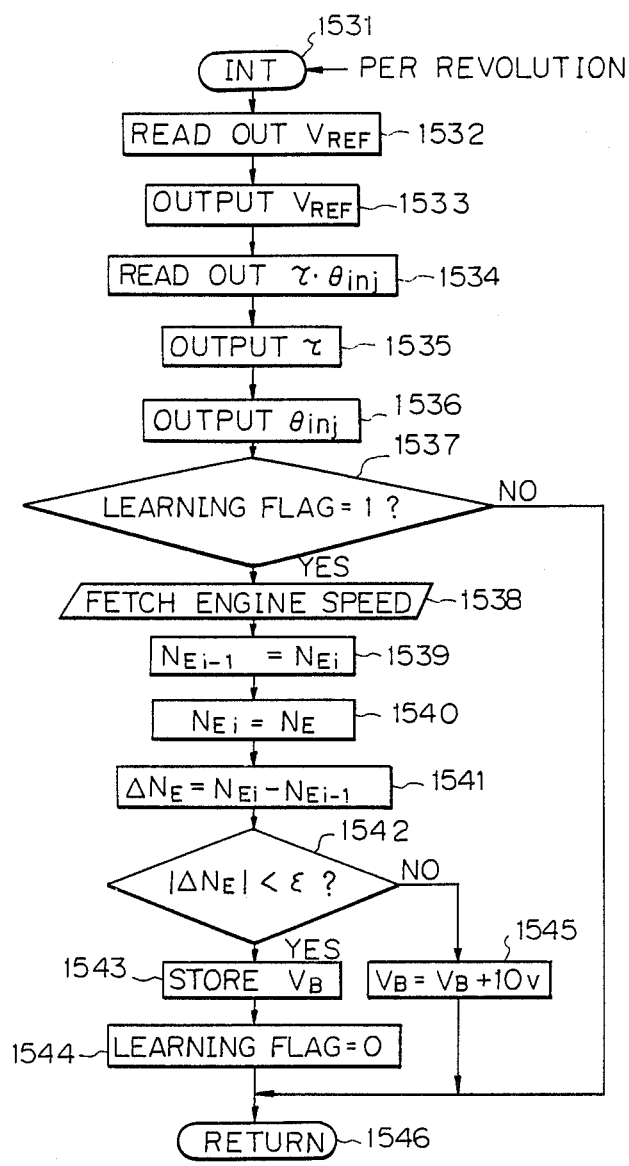

The operation of the control circuit 140 with the above arrangement will be described below with reference to the flow chart of FIG. 15. Initialization of various components is performed at the beginning of the main reoutine shown in FIG. 15(A), so that a voltage $V_B$ for controlling at the point B (FIG. 13) is reset to 0 V. It should be noted that the main feature of this embodiment is that the voltage $V_B$ is set to correspond with the optimal point B under the learning control. The starter signal is fetched and it is determined from the ON state of the starter than the engine has been started. At this time, since a large fuel injection amount is required, the voltage $V_B$ is set at 0 V, and the nozzle needle is fully lifted (step 1506). If the engine is not in the start mode, a learning flag is checked, and if it is detected that a learning mode is being carried out, the flow enters a start routine (step 1507). Since the engine is driven irrespective of an accelerator opening degree in the start or learning mode, the fuel injection amount is controlled only by the engine speed. An engine speed $N_E$ is fetched from the input interface 1407 (step 1508), and the injection period and the injection timing of the injection valve are obtained with reference to maps (steps 1509 & 1510). Furthermore, the voltage $V_{REF}$ is set to correspond to the voltage $V_B$ (in the start mode, $V_B$ is set at 0 V, and in the learning mode, is increased by 10 V per revolution), and the flow returns to step 1504 (step 1511). After the learning control is completed, since the learning flag becomes "0", the flow enters an injection control routine corresponding to normal driving (step 1507). The engine speed $N_E$ and the accelerator opening degree Accp are fetched (steps 1512 & 1513) to obtain the injection amount Q and the injection timing $\theta$inj with reference to maps (steps 1514 & 1515). It is then checked if the accelerator opening degree Accp is smaller than a predetermined opening (e.g., 10%) (step 1516). If YES in step 1516, a small lift mode is selected as a countermeasure against noise; otherwise, a large lift mode is selected for increasing power. In the small lift mode, the injection period $\tau$ is calculated from the injection amount Q by linear function that is $\tau = KQ$ (step 1517). Then, the voltage $V_{REF}$ is set equal to the voltage $V_V$ (i.e., the voltage after learning control to be controlled to the point B) (step 1518). In the large lift mode, if the opening area is five times that in the small lift mode, since an injection flow rate also increases five times, the injection period $\tau$ need only be 1/5 that in the small lift mode. More specifically, $\tau$ is calculated by the formula $\tau = 1/5KQ$ (step 1521). The reference voltage $V_{REF}$ is set to 0 V in order to carry out the large lift (step 1522). The obtained injection period $\tau$, the injection timing $\theta$inj, and the reference voltage $V_{REF}$ are stored in a memory (steps 1519 & 1520), and the flow returns to step 1504. An interrupt routine shown in FIG. 15(B) will be explained below. The interrupt routine is started at every revolution of the engine (step 1531). The voltage $V_{REF}$, the period $\tau$, and the timing $\theta$inj are read out from the memory (steps 1532 through 1534), and are supplied to the D/A converter 1412 (step 1533) and the output interface 1413 (steps 1535 & 1536). The output interface 1413 generates the first and second trigger signals at the predetermined timings to control the valve 1201. The learning flag is then checked (step 1537). If the learning control is compelted, the flow returns; otherwise, the engine speed is checked (step 1538). A previous engine speed NEi-1 is compared with a current engine speed NEi (steps 1539 through 1542), and if a difference therebetween is below a predetermined value $\epsilon$, the voltage $V_B$ is stored, and the learning mode ends (steps 1543 & 1544); otherwise, the voltage $V_B$ is increased by 10 V in order to continue the learning mode (step 1545). FIG. 16 is a graph for explaining the learning control. As the voltage $V_{REF}$ (i.e., the residual potential of the capacitor 1429) is lower, the needle stroke of the injection valve 1201 is larger. As can be seen from FIG. 13 showing the relationship between needle lift and the injection amount, when the voltage $V_{REF}$ is at 0 V, the injection is performed at the point C of FIG. 13. In other words, the engine speed is increased due to a large fuel injection amount. When the voltage $V_{REF}$ is increased by 10 V per revolution from this state, the fuel injection amount is reduced from the point C of FIG. 13 toward the point B. In this case, the engine speed also decreases, as indicated by a range C–B in FIG. 16. After the pont B is then reached, since the lift amount is changed between the points B and A but the fuel injection amount is not changed therebetween, the engine speed does not change as shown in FIG. 16. Therefore, the voltage $V_{REF}$ is gradually increased while observing a change in engine speed, and a point at which no change occurs can be set as the point B. Note that since the learning control of this embodiment is performed immediately after the engine starts, an increase in fuel injection amount required for the engine start mode can be effectively performed at the same time.

In the above descriptions, although the needle lift amount is switched in accordance with the accelerator opening degree, it is also possible to be switched in accordance with the engine speed. The present invention is also effective when the fuel injection valve 1201 is adopted as oil pressure control equipment having the same structure as above.

With the control apparatus for the fuel injection valve according to the present invention, the expansion/contraction stroke of the actuator 1202 is controlled not by a charge supply amount but by the discharge amount. In order to control the charge supply amount, the output voltage generated from the DC-DC converter 1423 is controlled in general. However, this results in poor response time due to the presence of the capacitor 1424. Contrary to this, with the control apparatus according to the present invention, the voltage of the capacitor 1429 is adjusted during an injection stop interval (which is long enough), and the discharge amount of the actuator 1202 is controlled thereby. Therefore, a sufficiently high response speed can be obtained.

Also, in the control apparatus described above, the small-diameter portion 1213 having a uniform diameter is formed at the distal end portion of the nozzle needle 1211, and extends through the injection opening 1215. With this arrangement, the minimum throttle area, which determines the fuel injection amount, can be stably controlled in two ways to correspond with the point C for a full-lift mode and between the points A and B in an intermediate-lift mode, as shown in FIG. 13, thereby using the injection valve 1201 as if it has two injection openings. Thus, when the accelerator opening degree is small, for example, the amount of lift is controlled to be near the point B between the points A and B, so that the fuel injection rate is decreased and noise is eliminated. When the accelerator opening degree is larger, the amount of lift is controlled to be at the point C, thereby increasing the fuel injection rate and power.

Furthermore, in the control apparatus of the present invention, when the amount of lift of the nozzle needle 1211 is controlled to be near the point B between the points A and B in FIG. 13, a residual potential of the capacitor 1429 is increased stepwise by a predetermined value, and the residual potential when a drop in engine speed is saturated is used for the subsequent control operation. Since this operation is performed immediately after the engine starts, the fuel injection amount can be naturally increased in the engine start mode, and the residual potential can be accurately determined without accompanying a uncomfortable change in engine speed.

Figure 17:
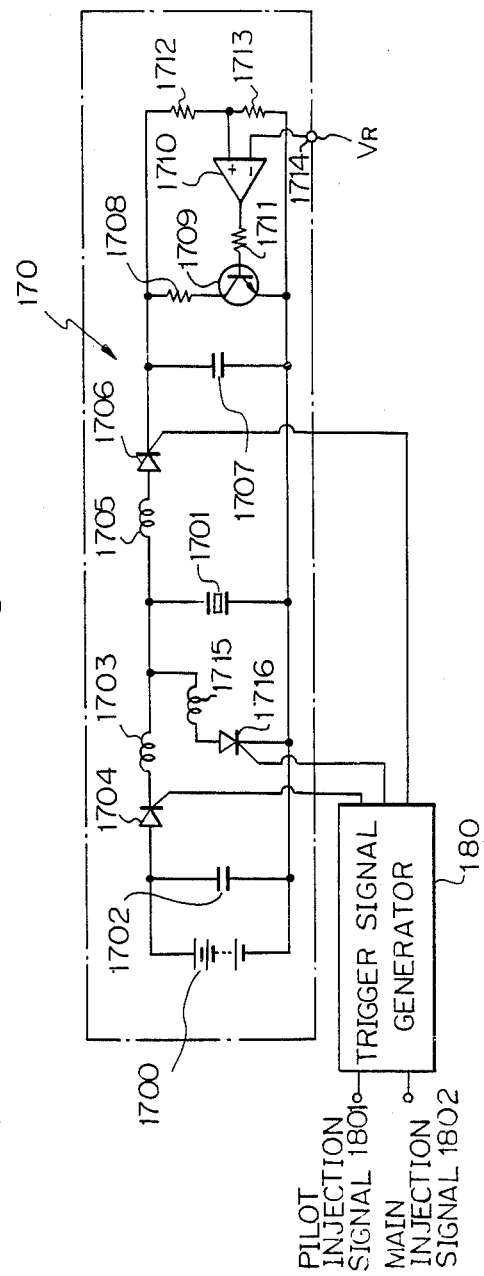
FIG. 17 is a circuit diagram of a drive circuit in the control apparatus for an electroexpansive actuator according to another embodiment of the present invention.

FIG. 17 shows a drive circuit 170 in a control apparatus for an electroexpansive actuator according to another embodiment of the present invention. Reference numeral 1700 denotes a 350 V high-voltage power source; 1702, a capacitor of a large capacitance, connected in parallel with the power source 1700, for supplying a transient large current necessary for driving an electroexpansive actuator 1701. Reference numeral 1704 denotes a first thyristor, the gate of which receives a first trigger signal from a trigger signal generator 180 (to be described later). Reference numeral 1703 denotes a coil having an inductance. The capacitor 1702, the first thyristor 1704, the first coil 1703, and the actuator 1701 form a series circuit. Reference numeral 1715 denotes a second coil; and 1716, a second thyristor, the gate of which receives a second trigger signal from the generator 180. The actuator 1701, the second coil 1715, and the second thyristor 1716 also form a series circuit. Reference numeral 1705 denotes a third coil; and 1706, a third thyristor, the gate of which receives a third trigger signal from the generator 180. Reference numeral 1707 denotes a capacitor for discharging the actuator 1701 to a certain level, which has a capacitance three times that of the actuator 1701. The actuator 1701, the third coil 1705, the third thyristor 1706, and the capacitor 1707 also form a series circuit, as shown in FIG. 17. Reference numeral 1709 denotes a transistor for controlling a potential of the capacitor 1707. The collector of the transistor 1709 is connected to the high-voltage side of the capacitor 1707 through a current-limiting resistor 1709. The emitter of the transistor 1709 is connected to a ground potential. Reference numeral 1710 denotes an operational amplifier, whose output is connected to the base of the transistor 1709 through a resistor 1711. The non-inverting input of the operational amplifier 1710 receives a high voltage of the capacitor 1707 voltage-divided by resistors 1712 and 1713, and the inverting input thereof receives a reference voltage $V_R$ through a terminal 1714.

Figure 18:
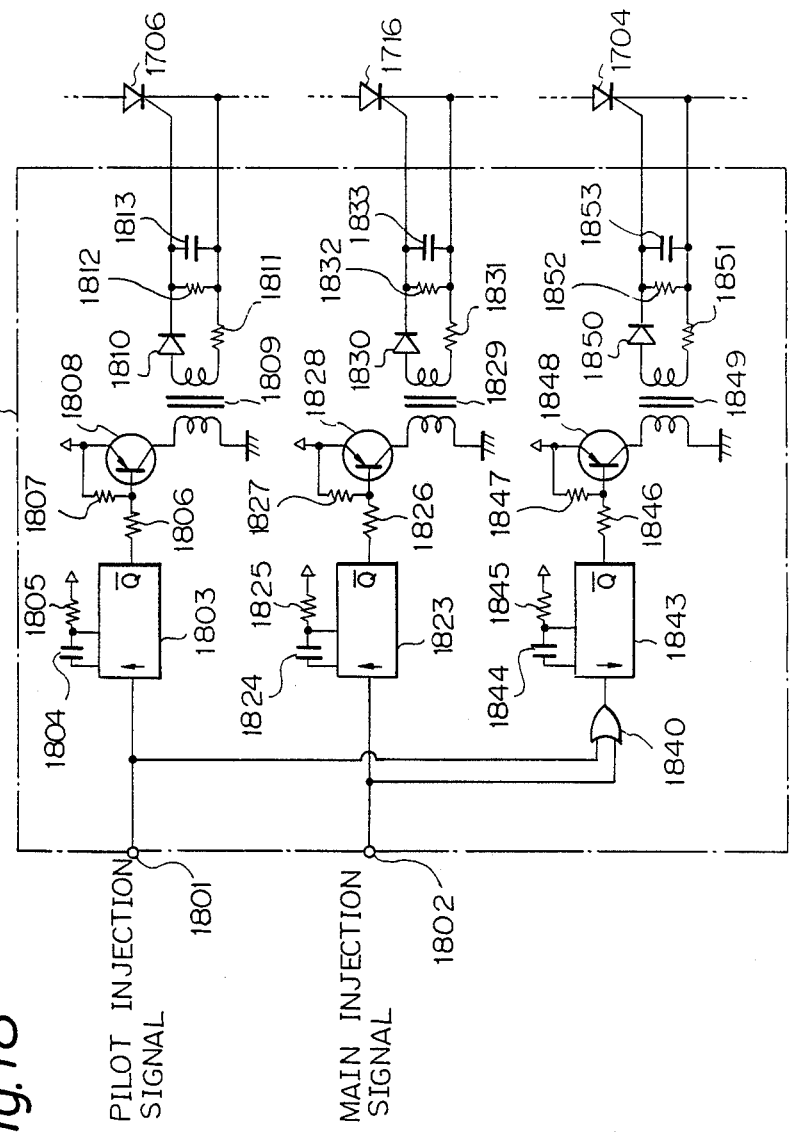
FIG. 18 is a circuit diagram of a trigger signal generator shown in FIG. 17.

The trigger signal generator 180 will now be described in detail. FIG. 18 is a circuit diagram of the generator 180. A pilot injection signal and a main injection signal are supplied to the generator 180 respectively through terminals 1801 and 1802, and a first one-shot multivibrator 1803 is triggered in synchronism with the leading edge of the pilot injection signal. Then, the multivibrator 1803 produces a "0" level signal whose pulse width (about 30 μs) is determined by a capacitor 1804 and a resistor 1805 as the $\overline{Q}$ output thereof. The "0" level signal is supplied to the base of a transistor 1808 through resistors 1806 and 1807. The emitter of the transistor 1808 is connected to a power source, and the collector thereof is connected to the primary side of a pulse transformer 1809. When the $\overline{Q}$ output of the first one-shot multivibrator 1803 is at "0" level, the transistor 1808 is turned ON, and a current flows through the primary side of the transformer 1809, thus inducing a first trigger signal at the secondary side thereof. The first trigger signal from the transformer 1809 is supplied to the gate of the third thyristor 1706 through a diode 1810 and a resistor 1811. A resistor 1812 and a capacitor 1813 eliminate noise components. A second one-shot multivibrator 1823 is triggered at the leading edge of the main injection signal, and a second trigger signal is supplied to the gate of the second thyristor 1716 by the similar circuit arrangement. The pilot and main injection signal are supplied to a two-input OR gate 1840, and the output signal thereof is then supplied to a third one-shot multivibrator 1843. A trigger signal is supplied to the gate of the first thyristor 1704 in synchronism with the trailing edge of each of the pilot and main injection signals.

Figure 19:
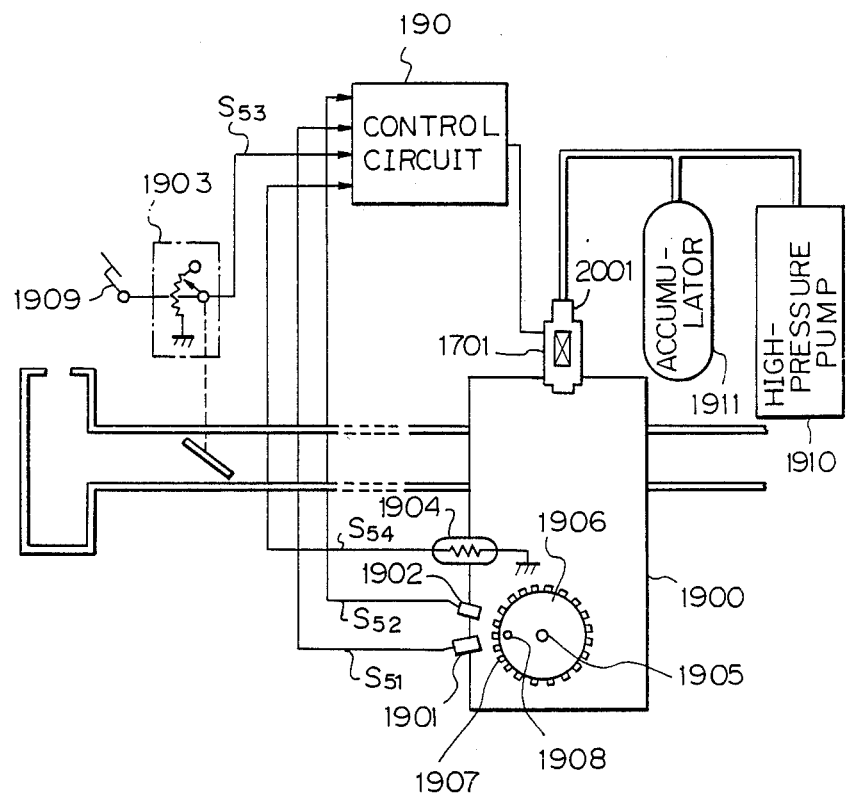
FIG. 19 is a schematic illustration of the overall arrangement of an internal combustion engine including a fuel injection valve controlled by the control apparatus shown in FIG. 17.

FIG. 19 shows an example of a diesel engine comprising a fuel injection valve to which the control apparatus shown in FIG. 17 is applied.

Referring to FIG. 19, reference numeral 2001 denotes an injection valve driven by the electroexpansive actuator 1701. The valve 2001 is mounted on a diesel engine 1900 so as to inject fuel from a nozzle thereof into a cylinder of the engine 1900. The valve 2001 receives comprssed fuel from an accumulator 1911. The accumulator 1911 receives and accumulates compressed fuel at, e.g., 200 kg/cm$^2$, from a high-pressure pump 1910 driven by the engine 1900.

Figure 20:
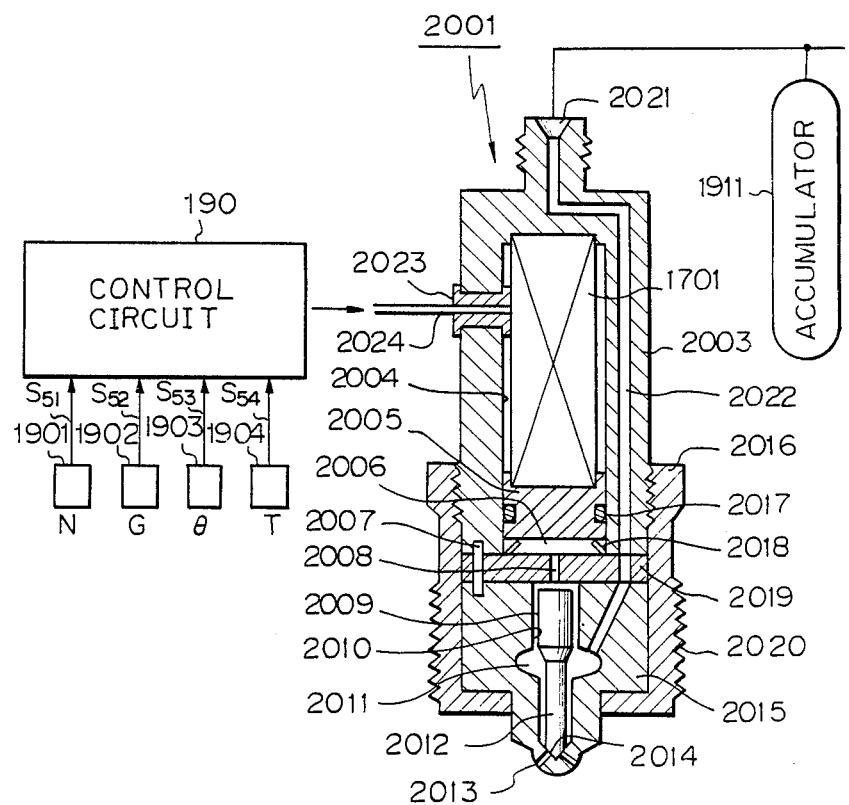
FIG. 20 is a sectional view of a fuel injection valve to which the control apparatus shown in FIG. 17 is applied.

FIG. 20 is a side view of an example of a hole nozzle type injection valve 2001. The voltage applied to the actuator 1701 is controlled by a control circuit 190. When the voltage is at −200 V, the injection valve 2001 is opened and injects fuel from an injection opening 2013 into a cylinder of the engine 1900. When the voltage is at +500 V, the valve 2001 is closed and stops fuel injection.

In FIG. 20, the valve 2001 is operated upon expansion/contraction of the actuator 1701. The actuator 1701 is constituted by stacking disk-shaped thin piezoelectric elements having an electroexpansive effect. Each piezoelectric element comprises ceramic obtained by sintering zirconium lead titanate (so-called PZT). If it is assumed to have a diameter of 15 mm and a thickness of 0.5 mm, when a voltage of 500 V is applied to the element along the direction of thickness, it expands by about 0.5 μm, and when a voltage of −200 V is applied thereto, contracts by about 0.5 μm. Therefore, when 100 elements are stacked one upon the other, expansion/contraction becomes 100 times that of a single element.

Silver electrodes are formed on two surfaces of each piezoelectric element of the actuator 1701, and one electrode is connected to a lead wire 2024 and the other is connected to a ground potential. The lead wire 2024 extends through an upper casing 2003 via a grommet 2023, and is connected to the control circuit 190. The expansion/contraction operation of the actuator 1701 is transmitted directly to a piston 2005 to vertically reciprocate it.

The piston 2005 is slidable in a cylinder 2004 of the upper casing 2003 to increase and decrease a volume of a pump chamber 2006, thus serving as a pump. A Belleville spring 2018 for biasing the piston 2005 in a direction of contraction of the actuator 1701 is arranged in the pump chamber 2006, thereby compensating for a weaker contraction force of the actuator 1701 than an expansion force thereof.

The pump chamber 2006 communicates with the interior of a needle cylinder 2010 of a nozzle body 2015 through a distance piece 2019. A nozzle needle 2012, the upper end face of which receives a pressure in the pump chamber 2006, is slidably housed in the needle cylnder 2010.

A communication hole 2008 is formed in the distance piece 2019 in the axial direction thereof, thereby communicating the pump chamber 2006 with the needle cylinder 2010.

A lower portion of the nozzle needle 2012 has a smaller diameter than that of a central portion thereof. The upper end face of the nozzle needle 2012 is a flat surface, and is brought into tight contact with the lower end face of the distance piece 2019 when the nozzle needle 2012 is moved upward. In this case, the communication hole 2008 is closed. The upper portion of the nozzle needle 2012 is slidable in the needle cylinder 2010, and a portion of an outer periphery of the upper portion is recessed to provide a width across slots, thus providing a small clearance 2009. The lower end portion of the nozzle needle 2012 is tapered to be in tight contact with a seat surface 2014 of the nozzle body 2015. Therefore, when the nozzle needle moves downward, the injection opening 2013 is closed, and when it moves upward, the opening 2013 is opened.

A ring-shaped fuel reservoir 2011 is formed in the central portion of the needle cylinder 2010, and communicates with a fuel path 2022, which extends through the nozzle body 2015, the distance piece 2019, and the upper casing 2003.

The upper casing 2003, the distance piece 2019, and the nozzle body 2015 have the same diameter and are stacked in the order named, and they are pressed and fixed by a bag-like lower casing 2016 in the axial direction. In this case, a male screw of the upper casing 2003 is engaged in a female screw of the lwoer casing 2016. Furthermore, the outer periphery of the lower casing 2016 has male screw 2020, and is fixed to the engine 1900 thereby.

Note that reference numeral 2017 denotes an O-ring; 2007, a knock pin; and 2021, a fuel inlet port formed in the upper casing 2003.

The operation of the fuel injection valve shown in FIG. 20 will now be described. When a voltage of +500 V is applied to the actuator 1701, the actuator 1701 expands. Therefore, the volume of the pump chamber 2006 is decreased to compress the fuel therein. This high pressure acts on the upper end face of the nozzle needle 2012 to urge it against the lower end face of the needle cylinder 2010. As a result, the injection opening 2013 is closed, and no fuel injection is performed. In this case, the fuel reservoir 2011 receives compressed fuel at a pressure of 200 kg/cm² from the accumulator 1911 through the fuel path 2022. Since the fuel pressure acts on the entire upper end face of the nozzle needle 2012 through the clearance 2009 of the nozzle needle 2012, the tapered surface of the lower end of the nozzle needle 2012 is retained in tight contact with the seat surface 2014 of the needle cylinder 2010.

In the above state, when a voltage of −200 V is applied to the actuator 1701, the actuator 1701 contracts, and the volume of the pump chamber 2006 is increased. As a result, the nozzle needle 2012 is moved upward by suction. In this case, although the compressed fuel in the fuel reservoir 2011 is also drawn by suction through the clearance 2009 of the nozzle needle 2012, since a distance between the upper end of the nozzle needle 2012 and the lower end of the distance piece 2019 is about 0.2 mm when the nozzle needle 2012 is in tight contact with the lower end of the needle cylinder 2010 and a path area of the clearance 2009 is small, the amount of fuel drawn through the clearance 2009 is negligible. Furthermore, in this case, if the upper end face of the nozzle needle 2012 is brought into tight contact with the lower end face of the distance piece 2019, the communication hole 2008 is closed. Therefore, in this state, since the fuel pressure of 200 kg/cm² acts on the entire lower surface of the nozzle needle 2012, the upper end face of the nozzle needle 2012 is retained in tight contact with the lower end face of the distance piece 2019, while fuel is injected through the injection opening 2013.

Also, in FIG. 20, signals $S_{51}$ to $S_{54}$ from sensors 1901 to 1904 are supplied to the control circuit 190.

The sensor 1901 is an angle sensor comprising a magnet pickup, and produces an angle signal $S_{51}$ corresponding to an engine speed $N_E$(rpm). The angle sensor 1901 is arranged adjacent to a signal plate 1906 mounted on a shaft 1905 which is rotated synchronous with half a revolution of an engine crank shaft, and detects projections 1907 formed on the outer periphery of the signal plate 1906 so as to produce the angle signal $S_{51}$ consisting of 720 pulses per revolution of the signal plate. A signal pulse of the angle signal $S_{51}$ corresponds to 1° CA of the engine crank shaft.

The sensor 1902 is a reference sensor comprising a magnet pickup, and detects a single projection 1908 formed on the signal plate 1906 to produce a reference signal $S_{52}$. The reference signal $S_{52}$ is generated at a reference position (in this embodiment, 30° CA before contraction top dead center of the engine or BTDC), and the projection 1908 is thus formed at a proper position.

The sensor 1903 is a load sensor comprising a potentiometer interlocked with an accelerator pedal 1909 and produces a voltage signal $S_{53}$ corresponding to an accelerator pedal opening degree $\theta$ (deg).

The sensor 1904 is a temperature sensor comprising a thermistor and is arranged in a water jacket in an internal combustion engine, and a resistance thereof is changed to correspond with a change in a cooling-water temperature T (°K.) of the engine to produce a signal $S_{54}$. Note that the temperature sensor 1904 can detect an intake air temperature in place of the cooling-water temperature.

The control circuit 190 calculates an optimum fuel injection amount q (g/st) based on the output signals $S_{51}$, $S_{53}$, and $S_{54}$ from the sensors 1901, 1903, and 1904 respectively corresponding to the engine speed $N_E$, the accelerator opening degree $\theta$, and the cooling-water temperature T of the engine, and also calculates an injection period $\tau$ ($\mu$sec) required for injecting the fuel amount q. At the same time, the control circuit 190 calculates an optimum fuel injection start timing and detects the coming of the start timing with reference to the sensors 1901 and 1902, and applies a given voltage to the actuator 1701 at the calculated timing to open the valve 2001. In this case, an injection rate (a fuel injection amount per unit time) is determined by an area of the injection opening 2013 and the fuel supply pressure (200 kg/cm²).

Figure 21:
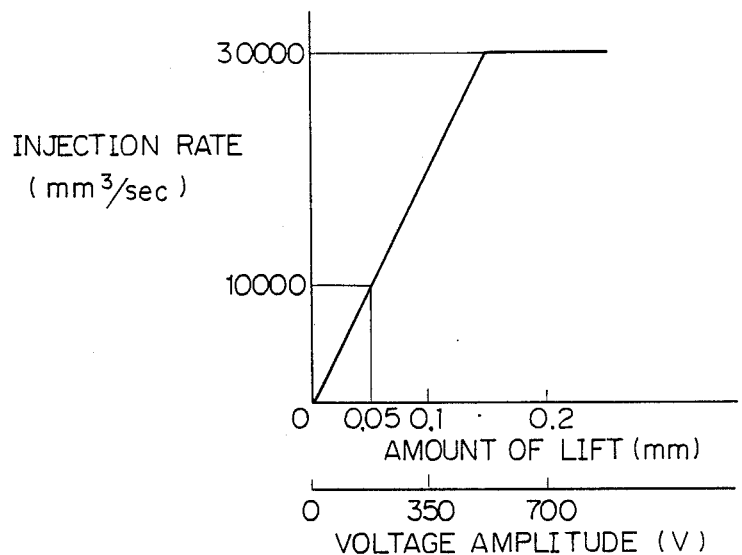
FIG. 21 is a graph showing fuel injection characteristics of the valve shown in FIG. 20.

This will be described in more detail with reference to FIG. 21. FIG. 21 is a graph showing the relationship between the amount of lift of the nozzle needle 2012 and the injection rate. Furthermore, this graph reveals that the amount of lift corresponds to a voltage applied to the actuator. In a small-lift amount region, since the path area is limited by the seat surface, the injection rate increases in proportion to the amount of lift. When the amount of lift further increases and exceeds 0.15 mm, since the path is limited by an opening area of the injection opening 2013, the injection rate is constant. A conventional actuator is normally used to obtain a full amount of lift of 0.2 mm.

Figure 22:
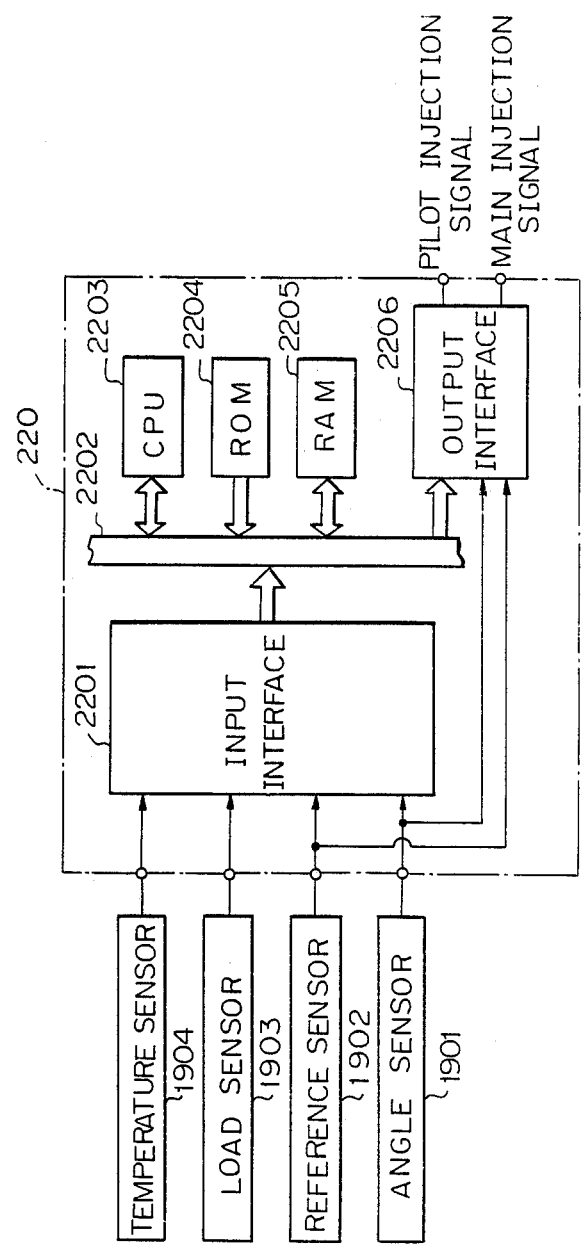
FIG. 22 is a block diagram of a circuit for operating and generating pilot and main injection signals for controlling the fuel injection valve.

A generator for generating the pilot and main injection signals will now be explained. FIG. 22 shows an arrangement of an operation circuit 220. Reference numeral 2201 denotes an input interface, which converts the voltage from the sensor 1903 corresponding to the accelerator opening degree and the voltage form the sensor 1904 corresponding to the water temperature into the digital value and supplies them onto a bus line 2202. The input interface 2201 also counts the engine speed with reference to the signals from the sensors 1902 and 1901 to supply it onto the bus line 2202. Reference numeral 2203 denotes a CPU which fetches data from the input interface 2201 and operates in accordance with a ROM 2204 storing various data and programs. Reference numeral 2205 denotes a RAM used for the operation of the CPU 2203. Reference numeral 2202 denotes the bus line used for data communication between the input interface 2201 and various other components. Reference numeral 2206 denotes an output interface. When the injection signal data calculated by the CPU 2203 is set in the output interface 2206, the interface 2206 performs predetermined count operation, and produces the pilot and main injection signals at given timings.

The operation of the above arrangement will be described. For the sake of simplicity, assume that the capacitor 1707 in FIG. 17 is charged to 325 V, and a voltage of the actuator 1701 is 500 V. Thus, the actuator 1701 is expanded, and fuel injection is stopped. The third trigger signal is generated in synchronism with the leading edge of the pilot injection signal (FIG. 23(C)), and the third thyristor 1706 is enabled. Since the voltage of the actuator 1701 is 500 V and that of the capacitor 1707 is 325 V, a current flows from the actuator 1701 to the capacitor 1707 through the third coil 1705. Since the actuator 1701 and the capacitor 1707 are capacitive elements and the third coil 1705 is an inductive element, a series resonance occurs thereby, and a sinusoidal current flows through the circuit. When the current value becomes 0, the third thyristor 1706 is commutated and disabled. At this time, if a capacitance of the capacitor 1707 is infinite and no circuit loss is present, the voltage of the actuator 1701 may be decreased to 150 V. However, in practice, since the capacitance of the capacitor 1707 is three times that of the actuator 1701 and the voltage of the capacitor 1707 increases as the current flows, the voltage of the actuator 1701 is decreased finally to 325 V (FIG. 23(F)), and the voltage of the capacitor 1707 is increased to about 380 V (FIG. 23(G)). Therefore, the voltage of the actuator 1701 is decreased by 175 V, and the actuator 1701 is contracted by an amount corresponding to the decrease in voltage. Referring again to FIG. 21, the amount of lift of the needle at this time is ⅓ that in a full-lift mode, and the fuel injection amount becomes also ⅓ (FIG. 23(H)).

Figure 24:
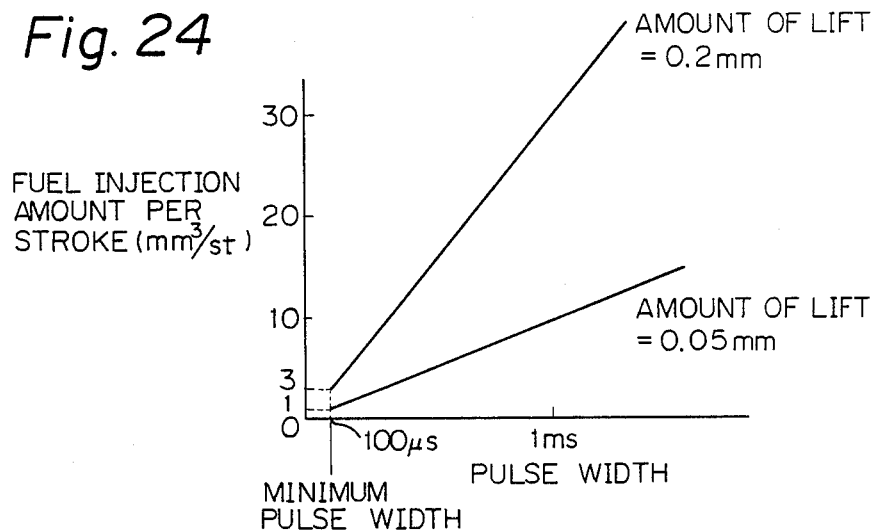
FIG. 24 is a graph showing fuel injection characteristics of the valve when the driven circuit shown in FIG. 17 is used.

FIG. 24 shows fuel injection amount characteristics. Due to the limitations of response time, when the amount of lift is 0.2 mm, a minimum fuel injection amount per stroke is 3 mm$^3$. On the other hand, when the amount of lift is 0.05 mm, 1 mm$^3$ of fuel can be injected as the minimum fuel injection amount per stroke. In order to achieve this, the voltage applied to the actuator 1701 must be controlled to accurately control the amount of contraction. The present invention can realize this requirement.

After a time $\tau p$ (e.g., 100 μsec) corresponding to a given pilot injection amount (e.g., 1 mm$^3$), the pilot injection signal goes to "0" level (FIG. 23(A)). In synchronism with this, the first trigger signal is generated (FIG. 23(D)), and the first thyristor 1704 is enabled. A current flows from the power source through the first coil 1703, and the actuator 1701 is again charged to +500 V (FIG. 23 (F)). Thus, the actuator 1701 is expanded to an initial length, and pushes the nozzle needle 2012 downward to stop fuel injection (FIG. 23(H)). After an interval $\tau d$ between pilot and main injection operations passed, the main injection signal goes to "1" level (FIG. 23(B)). Thereby, the second trigger signal is generated (FIG. 23 (E)), and the second thyristor 1716 is enabled. Then, a series resonance circuit consisting of the actuator 1701 and the second coil 1715 is formed, and the voltage of the actuator 1701 is decreased to −200 V (FIG. 23(F)). Referring to FIG. 21, the nozzle needle 2012 is fully lifted (0.2 mm), and allows a main injection. The main injection amount is determined by a "1" level interval $\tau m$ of the main injection signal. In synchronism with the trailing edge of the main injection signal, the first trigger signal is generated (FIG. 23(D)), and the first thyristor 1704 is enabled. Since a voltage of +500 V is applied to the actuator 1701 as above mentioned and the actuator 1701 is expanded, the nozzle needle 2012 is pressed downward, thus completing the fuel injection (FIG. 23(H)). In this connection, if the voltage of the capacitor 1707 is maintained to 380 V, the fuel injection amount in the next pilot injection mode will be further undesirably decreaesd. As described previously, the voltage of the capacitor 1707 must be set at 325 V. This operation will be explained in more detail. The voltage (380 V) of the capacitor 1707 is voltage-divided to 1/100 by the resistors 1712 and 1713, and is supplied to the noninverting input of the operational amplifier 1710, the inverting input of which receives the reference voltage $V_R$. When the reference voltage $V_R$ is 3.25 V, the output from the operational amplifier 1710 goes to high level to enable the transistor 1709 through the resistor 1711. Therefore, the capacitor 1707 is discharged through the resistor 1708, and the voltage thereof is gradually decreased. When the voltage of the capacitor 1707 decreases to 325 V, the output from the operational amplifier 1710 goes to low level and the transistor 1709 is disabled, so that the voltage of the capacitor 1707 can no longer be decreased. More specifically, the voltage of the capacitor 1707 is controlled to be reference voltage $V_R \times 100$. Assuming that a resistance of the resistor 1709 is 100Ω and a capacitance of the capacitor 1707 is 3 μF, a time required for discharging need only be 300 μsec or less. Therefore, the voltage of the capacitor 1707 is decreased to 325 V until the next fuel injection is carried out, thus realizing a stable pilot injection every time.

Operation of the pilot and main injection signals are performed by the above operation circuit 220 (FIG. 22). The engine speed $N_E$, the accelerator opening degree $\theta$, and the water temperature T are fetched from the input interface 2201, and the pilot injection timing $\theta p$, the pilot period $\tau p$, the pilot-main injection interval $\tau d$, and the main injection period $\tau m$ in predetermined engine conditions are calculated from maps stored in the ROM 2204. The resultant data is supplied to the output interface 2206. The output interface 2206 produces the pilot and main injection signals at given timings with reference to the reference, angle, and reference clock signals.

As described previously, the charge accumulated in the actuator 1701 is transferred to the capacitor 1707 which is controlled to have a predetermined initial voltage, and the actuator 1701 can be controlled to provide the smaller amount of expansion/contraction when compared with a conventional actuator. Therefore, a fuel injection operation of an injector can be switched to two modes (i.e., pilot and main injection modes) having different injection rates. In particular, in the pilot injection mode, a small amount of fuel can be stably injected with a high precision, unlike a conventioal injector.

Figure 25:
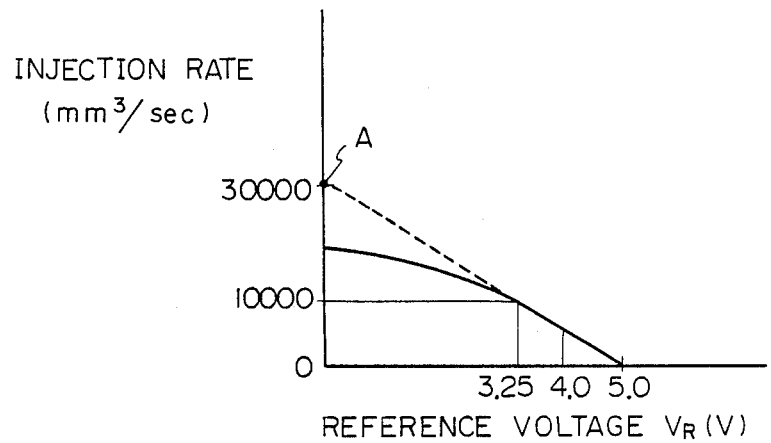
FIG. 25 is a graph showing fuel injection characteristics of the valve when a reference voltage supplied to the drive circuit shown in FIG. 17 is varied.
Figure 26:
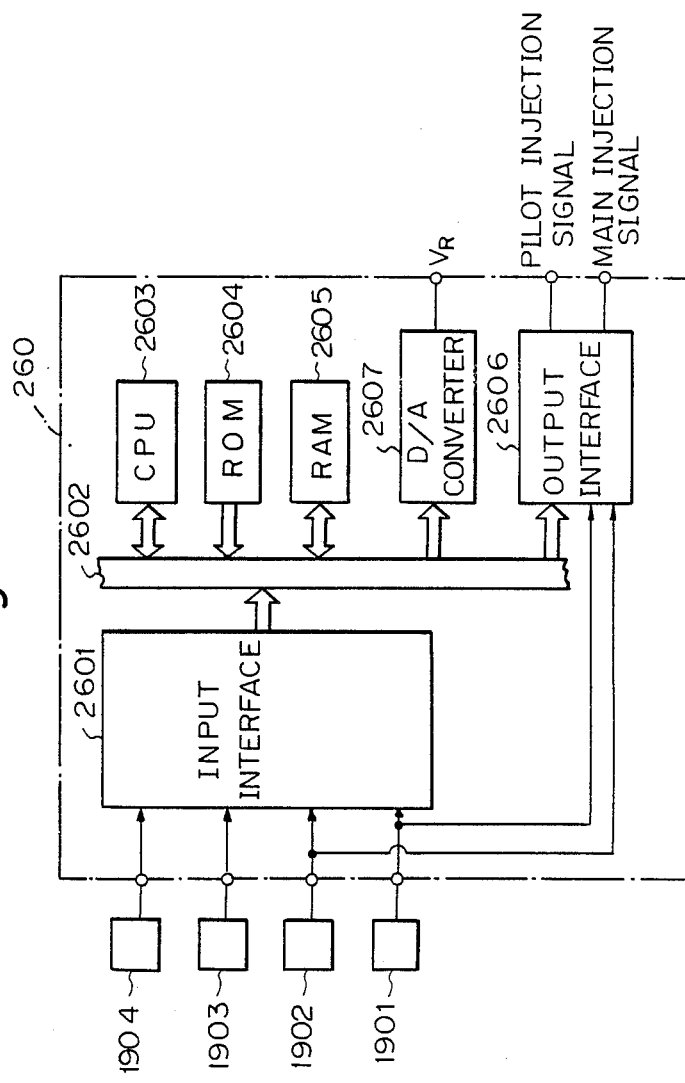
FIG. 26 is a block diagram of another circuit for operating and generating the pilotto and main injection signals.

In the above embodiment, the reference voltage $V_R$ is fixed at 3.25 V. However, when the reference voltage $V_R$ is changed, the injection rate can be successively changed. FIG. 25 is a graph showing the injection rate when the reference voltage $V_R$ is changed. In general, when the voltage $V_R$ is set at 0 V, the injection rate may be at the same level (indicated by A) as that in a conventional full-lift mode. However, since the capacitance of the capacitor 1707 is finite, the injection rate is about ⅔ that in the conventional full-lift mode. When the reference voltage $V_R$ is set at 3.25 V or more, the injection rate can be substantially linearly controlled. Therefore, by using this range, the injection rate of the injector can be controllealgh the reference voltage $V_R$. In this case, the drive circuit is the same as that in FIG. 17, but the operation circuit is different from that in FIG. 22 and a D/A converter 2607 produces the reference voltage $V_{R'}$ as shown in FIG. 26. Referring to FIG. 26, the D/A converter 2607 is connected to a bus line 2602, and produces therein the reference voltage $V_R$ corresponding to the injection rate calculated by a CPU 2603.

A control method will now be described. As described previously, when the engine speed is high, a certain amount of fuel (e.g., the maximum fuel injection amount: 30 mm³) must be injected within a certain limited injection period (30° CA) in order to improve the power. Due to this limitation, the injection rate of the injector must correspond with the maximum injection amount at the maximum engine speed (5,000 rpm). For this reason, the injection period becomes too short when the engine speed is low, or the lower limit of the minimum fuel injection amount is too large to carry out the pilot injection. However, according to the apparatus of this embodiment, although fuel is injected at the maximum injection rate in the full-lift mode as in the conventional injector when the engine speed is high, the injection rate is decreased in accordance with the engine speed when the engine speed is low so as to perform moderate combustion, thereby eliminating noise and vibration.

Assume that the maximum fuel injection amount necessary for the engine is 30 mm³ and this amount of fuel is injected within 30° CA. If the injection amount is given by q (mm³); the injection rate, Q (mm³/sec); the injection period, $\tau$ (sec); and the engine speed, N (rpm), the injection amount is:

$$q = Q \times \tau \quad (1)$$

If q=30 mm³, and $\tau = (60/N) \times (30° \text{ CA}/360° \text{ CA})$ are substituted for equation (1), $$Q = 6N \quad (2)$$

Figure 27:
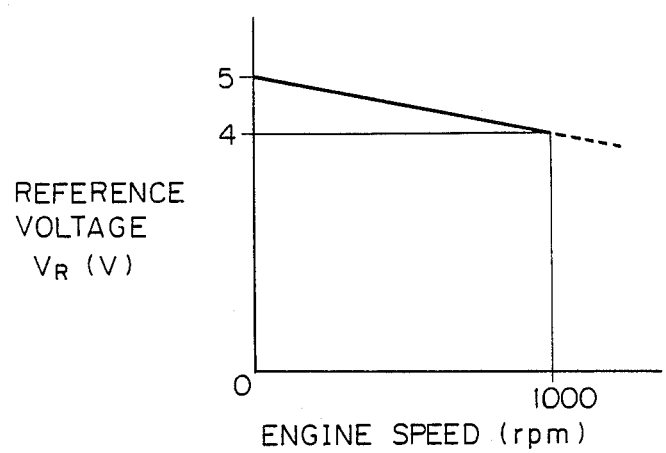
FIG. 27 is a graph showing the relationship between the engine speed and the reference voltage when the reference voltage is varied in accordance with the engine speed using the circuit shown in FIG. 26.
Figure 28:
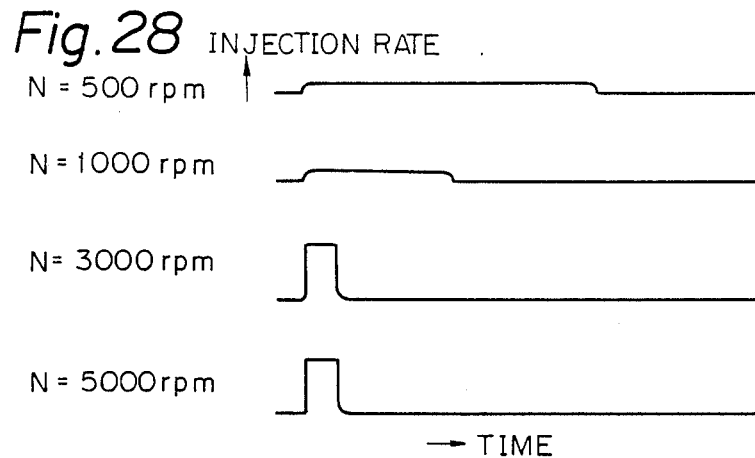
FIG. 28 is a timing chart when a fuel injection rate is controlled in accordance with the engine speed using the circuit shown in FIG. 26.

Therefore, the relationship between the engine speed N and the reference voltage $V_R$ is as shown in FIG. 27. Note that when the engine speed exceeds 1,000 rpm, since noise and vibration are neglibible, the actuator is controlled in the full-lift mode like the conventional actuator. The above control is performed by the operation circuit 260 shown in FIG. 26. The CPU 2603 fetches the engine speed N, the accelerator opening degree $\theta$, and the water temperature T from the input interface 2601, and calculates the injection amount q and the injection timing $\theta$inj necessary for the engine. The CPU 2603 checks if the engine speed N exceeds 1,000 rpm, and if its exceeds this value, the CPU 2603 calculates the injection period $\tau$ from equation (1) where Q=30,000 mm³/sec, and supplies it to the output interface 2606 for the main injection signal. When the engine speed N is below 1,000 rpm, the injection rate Q is calculated from equation (2) and the injection period $\tau$ is obtained from equation (1), and they are supplied to the output interface 2606 for the pilot injection signal. At the same time, the CPU 2603 calculates the reference voltage $V_R$ corresponding to the engine speed N from FIG. 27, and supplies it to the D/A converter 2607. FIG. 28 shows a change in the injection rate through the above operation.

Figure 29:
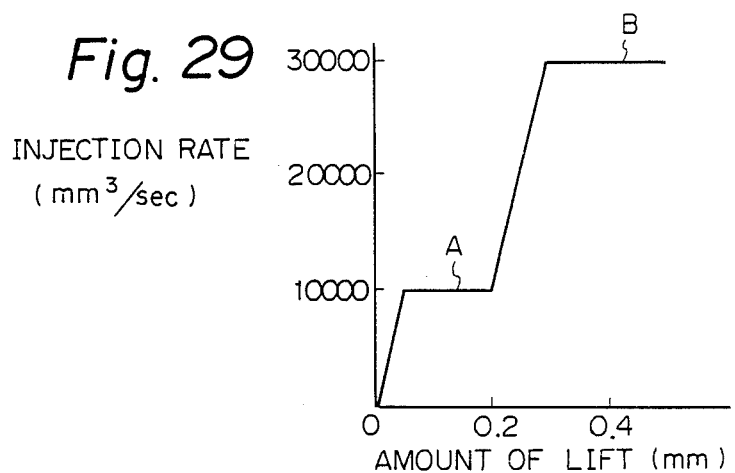
FIG. 29 is a graph showing fuel injection characteristics of a throttle nozzle type fuel injection valve.
Figure 30:
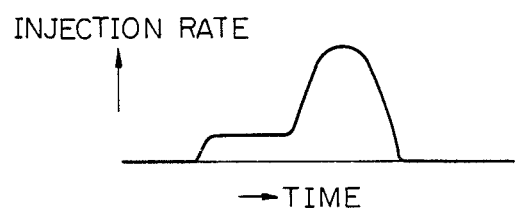
FIG. 30 is a timing chart for explaining the operation of the fuel injection valve when the control apparatus of the present invention is applied to the throttle nozzle type fuel injection valve.

A case will be described wherein the control apparatus shown in FIG. 17 is applied to a throttle nozzle type fuel injection valve. FIG. 29 shows the general relationship between an amount of needle lift of a throttle nozzle type valve and an injection rate. Unlike a hole nozzle type valve, since a throttle nozzle type valve has a throttle portion, it has a low injection rate region (indicated by A in FIG. 29) and a high injection rate region (indicated by B in FIG. 29). If the arrangement of the above embodimetn is applied to a throttle nozzle type valve, there is a feature wherein the error in injection rate is small irrespective of variations in an amount of expansion/contraction of an electroexpansive actuator and in the amount of lift in the pilot injection mode. In this connection, in the following embodiment, the amount of expansion/contraction of the actuator can be controlled stepwise in two modes to realize an injection pattern shown in FIG. 30.

Figure 31:
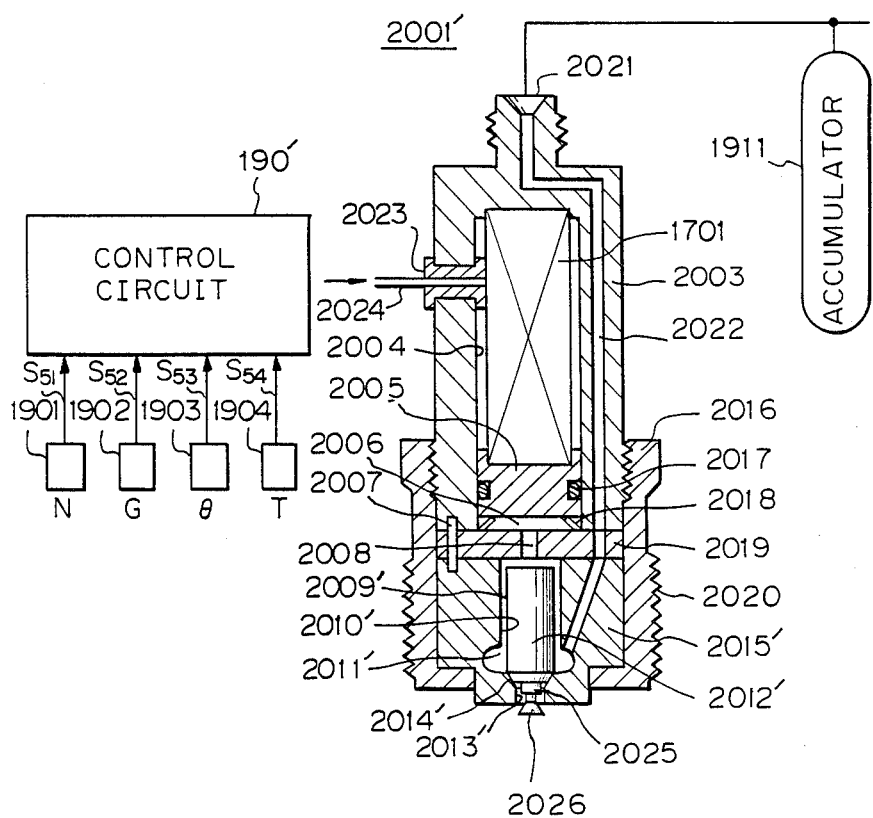
FIG. 31 is a sectional view of the throttle nozzle type fuel injection valve to which the control apparatus of the present invention is applied.

FIG. 31 shows an example of an injector using the throttle nozzle. Since this injector has substantially the same structure as that of the hole nozzle type injector shown in FIG. 20, only a difference therebetween will be described below. Reference numeral 2015' denotes a nozzle body, along the central axis of which a needle cylinder 2010' is arranged, and a nozzle needle 2012' is slidably housed therein. A pressure in a pump chamber 2006 acts on the upper end face of the nozzle needle 2012'. The upper end face of the nozzle needle 2012' is a flat surface, and is brought into tight contact with the lwoer end face of a distance piece 2019 when the nozzle needle 2012' moves upward, and a communication hole 2008 is closed. The nozzle needle 2012' slidably moves in the needle cylinder 2010', and a portion of its outer periphery is recessed to provide a width across slots, thus providing a clearance 2009'. The lower portion of the nozzle needle 2012' is tapered to be in tight contact with a seat portion 2014' of the nozzle body 2015'. Thus, when the nozzle needle 2012' moves downward, an injection opening 2013' is closed thereby, and when it moves upward, the opening 2013' is opened to inject fuel. A throttle portion 2025 having a diameter slightly smaller than that of the injection opening 2013' is formed in the lower end of the nozzle needle 2012', and a tapered projection 2026 for increasing an injection angle is arranged at the distal end thereof. A throttle is formed by a gap between the throttle portion 2025 and the injection opening 2013', thus realizing a low injection rate region of FIG. 29. When the nozzle needle 2012' is lifted up, an overlap portion between the throttle portion 2025 and the injection opening 2013' is reduced, thus realizing a high injection rate region of FIG. 29. A ring-shaped fuel reservoir 2011' is formed in the lower portion of the needle cylinder 2010', and communicates with a fuel path 2022.

These are the structural differences between the valves in FIGS. 20 and 31. The operation of the valve of this embodiment is substantially the same as the previous embodiment. In this case, however, an amount of lift of the needle 2012' is set of 0.4 mm, i.e., twice that of the valve in the previous embodiment.

Figure 32:
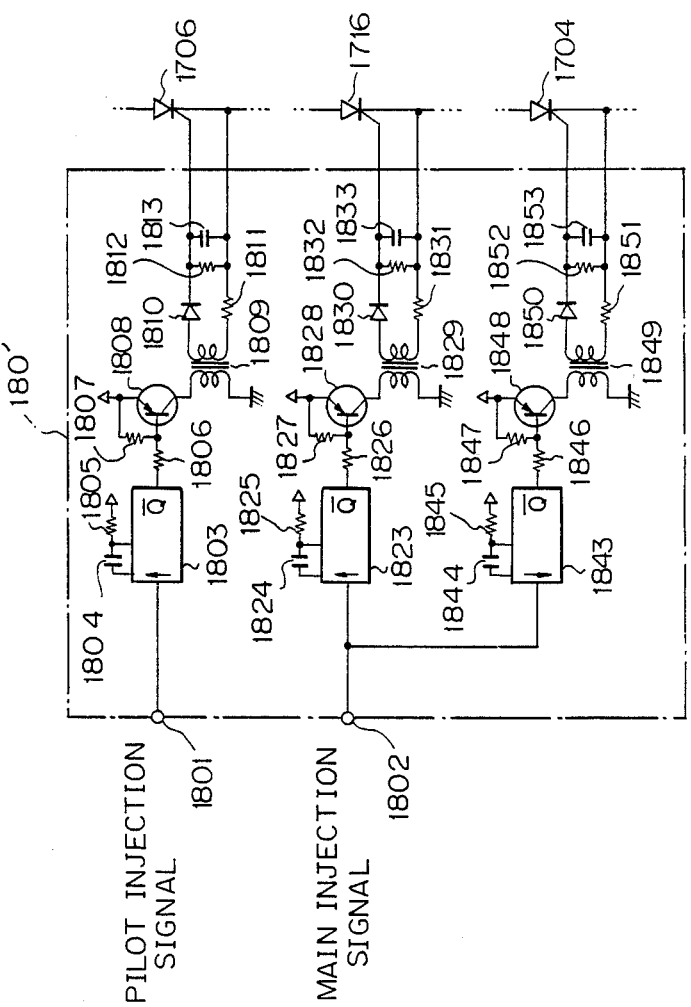
FIG. 32 is a circuit diagram of another example of the trigger signal generator shown in FIG. 18.

A control circuit therefor will now be described. The same operation circuit as in FIG. 22 is used and generates pilot and main injection signals. However, the pilot injection signal has an importance only in its rising timing and has no significance in pulse width. A drive circuit has a different trigger signal generator compared with that shown in FIG. 18. FIG. 32 shows a trigger signal generator 180' in this embodiment. Differences from the arrangement of FIG. 18 are that the two-input OR gate is omitted, and that the main injection signal is supplied directly to the trigger input of a third one-shot multivibrator 1843. The operation of the above arrangement will be described hereinafter.

Figure 33:
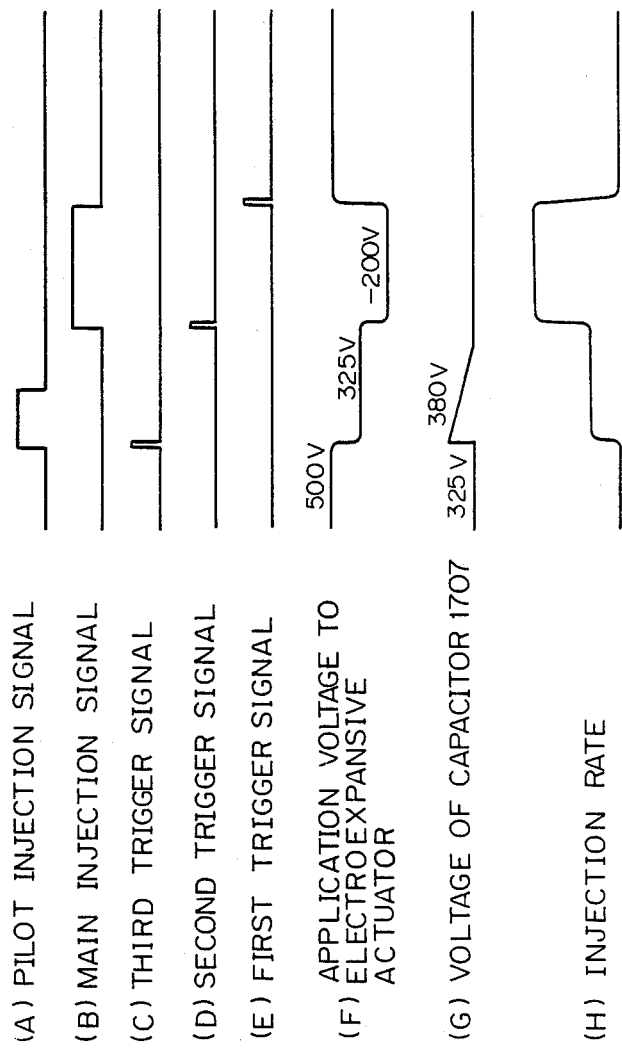
FIG. 33 is a timing chart for explaining the operation when the drive circuit shown in FIG. 17 is driven by the trigger signal generator shown in FIG. 32.

FIG. 33 is a timing chart for explaining the operation. Assume that the electroexpansive actuator 1701 is charged to 500 V, the capacitor 1707 is charged to 325 V, and the reference voltage $V_R$ is set at 3.25 V. The third trigger signal is generated in synchronism with the leading edge of the pilot injection signal (FIG. 33(C)). Thereby, the third thyristor 1706 is enabled, and then actuator 1701 is discharged to 325 V (FIG. 33(F)) as described previously. In this way, the needle 2012' is lifted by 0.1 mm corresponding to ¼ the full-lift amount, and fuel injection in the low injection rate region shown in FIG. 29 is performed (FIG. 33(H)). The second trigger signal is generated in synchronism with the leading edge of the main injection signal (FIG. 33(D)) to enable the second thyristor 1716. Thus, the actuator 1701 is discharged to −200 V (FIG. 33(F)), and the needle 2012' is fully lifted, thus enabling fuel injection in the high injection rate region of FIG. 29 (FIG. 33(H)). After a predetermined injection period, the first trigger signal is generated in synchronism with the trailing edge of the main injection signal (FIG. 33(E)), thus enabling the first thyristor 1704. Since the actuator 1701 is charged to 500 V (FIG. 33(F)), the needle 2012' is pushed downward, thus interrupting injection (FIG. 33(H)). Then, the voltage of the capacitor 1707 is recovered to a predetermined voltage of 325 V until the next injection operation.

Therefore, in this case, when the high and low injection rate regions of the throttle nozzle are used, since the injection rate can be changed during a single injection period, an initial injection rate can be reduced, thus effectively eliminating noise and vibration. Furthermore, in the low injection rate region, even if the amount of lift varies slightly, the injection rate is not influenced thereby because of the throttle structure, thus reducing an error.

According to a fuel injection control apparatus of the present invention as described above, a voltage applied to an electroexpansive actuator can be varied widely with high response by a single power source. As a result, when this apparatus is applied to an injector an injection rate thereof can be freely changed. Therefore, a dynamic range can be widened when compared with a conventional apparatus. In particular, since an injection rate can be decreased at a low vehicle speed, reduction in engine noise and vibration and an improvement in emission can be realized.

We claim:

1. A control appartus for an electroexpansive actuator, comprising:

an electroexpansive actuator which has a stroke that is controlled in accordance with an amount of potential discharged therefrom;

means for supplying a potential to said electroexpansive actuator; and means for controlling an amount of potential discharged from said electroexpansive actuator, comprising (a) a capacitor, coupled to said electroexpansive actuator, for receiving a storing said potential discharged from said electroexpansive actuator as a stored potential, and (b) means for controlling said stored potential of said capacitor before the charge is discharged from said actuator.

2. An apparatus according to claim 1, wherein said stored potential control means comprises transistor means for discharging said capacitor until said stored potential of said capacitor becomes less than a predetermined value.

3. An apparatus according to claim 1, wherein said electroexpansive actuator comprises a piezoelectric element.

4. A control apparatus as in claim 1 wherein said electroexpansive actuator is for driving a fuel injection valve of said engine, and said controlling means includes means for controlling said stored potential of said capacitor in accordance with operating conditions of said engine.

5. An apparatus according to claim 4, wherein said stored potential control means comprises reference voltage input and comparison means for discharging said capacitor until said stored potential of said capacitor is lowered to predetermined value corresponding to a reference voltage which is changed in accordance with operating conditions of said engine.

6. An apparatus according to claim 5, wherein said electroexpansive actuator is controlled by a drive frequency thereof, which is changed in accordance with operating conditions of said engine and said reference voltage.

7. An apparatus according to claim 4, wherein said supplying means comprises a DC power source, a first current limiting element in series with said DC power source, and a first switching element connected between said DC power source and said electroexpansive actuator, and said controlling means comprises a second current limiting element, and a second switching element connected between said electroexpansive actuator and said capacitor.

8. An apparatus according to claim 7, further comprising drive signal input means for receiving drive signals and providing trigger signals to said first and second switching elements, said trigger signals generated respectively in synchronism with leading and trailing edges of the drive signal.

9. An appartus according to claim 7, wherein said first and second switching elements are thyristors.

10. An apparatus according to claim 7, wherein said first and second current limiting elements are coils having an inductance.

11. An apparatus according to claim 7, further comprising means for discharging said electroexpansive actuator, said discharging means including a third current limiting element and a third switching element connected in series between both ends of said electroexpansive actuator.

12. An apparatus according to claim 11, wherein said third switching element is a thyristor.

13. An apparatus according to claim 11, wherein said third current limiting element is a coil having an inductance.

14. A control apparatus for fuel injection valve, comprising:
- an electroexpansive actuator;
- means for supplying a potential to said electroexpansive actuator;
- means for controlling an amount of potential discharged from said electroexpansive actuator, said control means comprising (a) a capacitor for receiving and storing said potential discharged from said electroexpansive actuator as a stored potential and (b) means for controlling an amount of said residual potential of said capacitor before said potential is discharged from said actuator, said amount being selectively changed in accordance with an engine speed; and
- a nozzle needle, coupled to said exlectroexpansive actuator, for selectively assuming a position engaged with or lifted from a valve seat, in accordance with an expansion/contraction of said electroexpansive actuator upon supply/discharge of said potential to/from said electroexpansive actuator, wherein an amount of lift of said nozzle needle is controlled in accordance with said amount of potential discharged from said electroexpansive actuator.

15. An apparatus according to claim 14, wherein said stored potential control means comprises a transistor element for discharging said capacitor until said amount of said residual potential of said capacitor is lowered to a predetermined value which changes in accordance with operating conditions of said engine.

16. An apparatus according to claim 14, wherein said stored potential control means comprises reference voltage input means for discharging said capacitor until said stored potential of said capacitor is lowered to a predetermined value coresponding to a reference voltage which changes in accordance with operating conditions of the engine.

17. An apparatus according to claim 14, wherein said nozzle needle comprises a lift region in which an opening area of a nozzle is not changed, the lift amount of said nozzle needle being controlled to be within the lift region.

18. An apparatus according to claim 14, further comprising voltage value storage means, said voltage value storage means storing a voltage value corresponding to a voltage occurring at a time when a change in engine speed or engine power in relation to a change in said stored potential of said capacitor is stopped, and said stored potential of said capacitor is controlled to coincide with the stored voltage value.

19. An apparatus according to claim 14, wherein said supply means comprises a DC power source, a first current limiting element in series with said DC power source and a first switching element connected between said DC power source and said electroexpansive actuator, and said control means comprises a second current limiting element and a second switching element connected between said electroexpansive actuator and said capacitor.

20. An apparatus according to claim 14, wherein said electroexpansive actuator comprises a piezoelectric element.

21. An apparatus according to claim 17, wherein an amount of lift of said nozzle needle is controlled to be within said left region when an opening degree of an accelerator lever or pedal of an engine is below a preset value.

22. An apparatus according to claim 16, wherein said electroexpansive actuator is controlled by a drive freuqency thereof which changes in accordance with operating conditions of said engine, and is controlled by said reference voltage in accordance with a fuel injection amount.

23. An apparatus according to claim 19, further comprising drive signal input means for receiving a drive signal in which leading and trailing edges correspond respectively to beginning and end of a fuel injection period, and producing trigger signals coupled to said first and second switching elements, said trigger signals generated respectively in synchronism with leading and trailing edges of the drive signal.

24. An apparatus according to claim 19, wherein said first and second switching elements are thyristors.

25. An apparatus according to claim 19, wherein said first and second current limiting elements are coils having an inductance.

26. An apparatus according to claim 19, further comprising means for discharging said electroexpansive actuator, said discharging means comprising a third current limiting element and a third switching element connected in series between both ends of said electroexpansive actuator.

27. An apparatus according to claim 26, wherein said third switching element is a thyristor.

28. An apparatus according to claim 26, wherein said third current limiting element is a coil having an inductance.

29. An apparatus for controlling fuel injection in a diesel engine comprising:
- a fuel injection valve having an electroexpansive actuator coupled to a nozzle needle;
- a DC power source;
- a first switching element connected in series between said actuator and said power source;
- a second switching element connected in parallel with said actuator;
- a capacitor;
- a third switching element connected in series between said actuator and said capacitor;
- circuit means for generating a pilot injection signal and a main injection signal in accordance with operating condition of said engine;
- means for turning on said first switching element to render it conductive before said pilot injection signal and main injection signal are generated, to charge said actuator using said DC power source;
- means for turning on said third switching element to render conductive said third switching element in response to said pilot injection signal, to discharge a potential of said actuator until a voltage of said actuator is decreased to a reference level, said nozzle needle being lifted by the contraction of said actuator to cause a pilot fuel injection into said engine;
- means for determining said reference level so that a lift of said nozzle needle for said pilot fuel injection is limited to being less than full lift thereof; and means for turning on said second switching element in response to said main injection signal to discharge said potential of said actuator so that said nozzle needle is fully lifted by the contraction of said actuator for a main fuel injection into said engine.

30. An apparatus according to claim 29, wherein an injection operation of a predetermined amount of fuel is divided into an injection operation at a low injection rate based on the pilot injection signal, and an injection operation at a high injection rate based on the main injection signal.

31. An apparatus according to claim 29, wherein an injection operation of a predetermined amount of fuel is performed such that the injection operation at a low injection rate is initially performed, and an injection operation at the high injection rate is performed thereafter.

32. An apparatus according to claim 29, wherein an injection operation at a high injection rate, based on the main injection signal, is performed when an engine speed exceeds a predetermined value, and an injection operation at a low injection rate, based on the pilot injection signal, is performed when the engine speed is below the predetermined value.

33. An apparatus according to claim 32, wherein the degree of the low injection rate is decreased as the engine speed decreases.

34. A method for controlling an electroexpansive actuator to drive a fuel injection valve of an engine, comprising the steps of:

supplying a potential to said electroexpansive actuator;

providing a capacitor to receive potential from said electroexpansive actuator;

discharging said capacitor until a potential of said capacitor is lowered to a predetermined value before said capacitor receives potential from said electroexpansive actuator; and subsequent to said discharging step, discharging a potential in said electroexpansive actuator into said capacitor, wherein a stroke of said electroexpansive actuator is controlled in accordance with an amount of potential discharged thereform.

* * * * *